US007954003B2

(12) United States Patent
Ikeda et al.

(10) Patent No.: US 7,954,003 B2
(45) Date of Patent: May 31, 2011

(54) FAULT MANAGEMENT SYSTEM IN MULTISTAGE COPY CONFIGURATION

(75) Inventors: Hirokazu Ikeda, Yamato (JP); Hironori Emaru, Yokohama (JP); Hiroshi Wake, Yokohama (JP); Masahide Sato, Noda (JP); Takashige Iwamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/633,193

(22) Filed: Dec. 8, 2009

(65) Prior Publication Data

US 2010/0088556 A1    Apr. 8, 2010

Related U.S. Application Data

(63) Continuation of application No. 11/079,237, filed on Mar. 15, 2005, now Pat. No. 7,644,301.

(30) Foreign Application Priority Data

Dec. 27, 2004  (JP) ................................ 2004-377176

(51) Int. Cl.
*G06F 11/00* (2006.01)
(52) U.S. Cl. .......................................... 714/6; 711/162
(58) Field of Classification Search .................. 714/5, 6; 711/162
See application file for complete search history.

(56) References Cited

U.S. PATENT DOCUMENTS

| | | | |
|---|---|---|---|
| 5,734,818 A | 3/1998 | Kern et al. | |
| 6,526,419 B1 | 2/2003 | Burton et al. | |
| 7,103,653 B2 | 9/2006 | Iwatani | |
| 7,149,919 B2* | 12/2006 | Cochran et al. | 714/4 |
| 7,185,227 B2 | 2/2007 | Eguchi et al. | |
| 7,191,198 B2 | 3/2007 | Asano et al. | |
| 7,353,434 B2 | 4/2008 | Fujimoto | |
| 7,512,755 B2* | 3/2009 | Iwamura et al. | 711/161 |
| 7,644,301 B2* | 1/2010 | Ikeda et al. | 714/6 |
| 2002/0078296 A1 | 6/2002 | Nakamura et al. | |
| 2004/0260873 A1* | 12/2004 | Watanabe | 711/114 |

FOREIGN PATENT DOCUMENTS

| | | |
|---|---|---|
| JP | 10-022947 | 1/1998 |
| JP | 3149325 | 1/2001 |
| JP | 2002-063063 | 2/2002 |
| JP | 2004-234555 | 8/2004 |
| JP | 2004-252686 | 9/2004 |

OTHER PUBLICATIONS

Veritas Software Corporation: "Veritas Volume Manager Administrator's Reference Guide Release 3.0.1. Chapter 1" Reference Guide, May 1999, pp. 1-38.

(Continued)

*Primary Examiner* — Philip Guyton
(74) *Attorney, Agent, or Firm* — Antonelli, Terry, Stout & Kraus, LLP.

(57) ABSTRACT

A data storing system including: a first, second and third storage systems providing first, second and third logical volumes; wherein the first logical volume and the second logical volume forms a first replication pair which indicates the first logical volume is a replication source and the second logical volume is a replication destination, and the second logical volume and the third logical volume forms a second copy pair which indicates the second logical volume is the replication source and the third logical volume is the replication destination. The replication pairs may adopt differing possible pair statuses, which may affect consistency between such pairs.

6 Claims, 19 Drawing Sheets

OTHER PUBLICATIONS

David V Pitts; Institute of Electrical and Electronics Engineers: "The RM recovery services" Proceedings of the International Symposium on Fault Tolerant Computing Montral, Jun. 25-27, 1991, International Symposim on Fault Tolerant Computing Systems. Los Alamitos, IEEE Comp Soc. Press, US, vol. Symp. 21, Jun. 25, 1991, pp. 360-367.

Veritas Software Corporation: "Veritas Volume Manager Administrator's Reference Guide Release 3.0.1 Chapter 5" Reference Guide, May 1999, pp. 115-147.

Veritas Software Corporation: "Veritas Volume Manager Administrator's Reference Guide Release 3.0.1 Chapter 3" Reference Guide, May 1999, pp. 63-92.

* cited by examiner

| PVOL | SVOL | COPY GROUP NAME | PAIR NAME | PAIR STATUS | APPLICATION | STATIC FLAG |
|---|---|---|---|---|---|---|
| VOL10 | VOL20 | CG12 | P1020 | PAIR | O | |
| VOL11 | VOL21 | CG12 | P1121 | PAIR | O | |
| VOL12 | VOL22 | CG12 | P1222 | PAIR | O | |
| VOL20 | VOL30 | CG23 | P2030 | SUSPEND | | |
| VOL21 | VOL31 | CG23 | P2131 | SUSPEND | | |
| VOL22 | VOL32 | CG23 | P2232 | SUSPEND | | |
| VOL30 | VOL40 | CG34 | P3040 | PAIR | | |
| VOL31 | VOL41 | CG34 | P3141 | PAIR | | |
| VOL32 | VOL42 | CG34 | P3242 | PAIR | | |

FIG.5

| VOLUME 601 | DATA NAME 602 | APPLICATION STATICIZED TIME 603 | BACKUP ID 604 | APPLICATION VOLUME 605 |
|---|---|---|---|---|
| VOL10 | host1 | LATEST | — | VOL10 |
| VOL11 | SQL Server | | | VOL11 |
| VOL12 | sqlinstance01 | | | VOL12 |
| VOL20 | host1 | LATEST | — | VOL10 |
| VOL21 | SQL Server | | | VOL11 |
| VOL22 | sqlinstance01 | | | VOL12 |
| VOL30 | host1 | 05.10.2004 00:00 | BID001 | VOL10 |
| VOL31 | SQL Server | | | VOL11 |
| VOL32 | sqlinstance01 | | | VOL12 |
| VOL40 | host1 | 05.10.2004 00:00 | BID001 | VOL10 |
| VOL41 | SQL Server | | | VOL11 |
| VOL42 | sqlinstance01 | | | VOL12 |

| VOLUME | COPY GROUP NAME | PAIR NAME |
|---|---|---|
| VOL10 | CG12 | P1020 |
| VOL11 | CG12 | P1121 |
| VOL12 | CG12 | P1222 |

| OUTPUT INFORMATION TYPE | | CONTENT |
|---|---|---|
| DATA NAME | APPLICATION SERVER NAME | Host1 |
| | APPLICATION NAME | SQL Sever |
| | INSTANCE NAME | sqlinstance01 |
| APPLICATION STATICIZED TIME | | LATEST |
| STORAGE SYSTEM NAME | LOCAL | — |
| | REMOTE | Abc13468@192.16.1.1 (REMOTE COPY) |

| # | FAULT DETAIL CODE | RESYNC ACCEPTANCE / REJECTION |
|---|---|---|
| 1 | x001 | REJECTION |
| 2 | x002 | ACCEPTANCE |
| ...... | ...... | ...... |
| xx | xc99 | ACCEPTANCE |
| yy | xca0 | REJECTION |
| ...... | ...... | ...... |

*FIG. 19*

FAULT MANAGEMENT SYSTEM IN MULTISTAGE COPY CONFIGURATION

CROSS REFERENCE TO RELATED APPLICATION

This is a continuation of U.S. application Ser. No. 11/079,237, filed Mar. 15, 2005 now U.S. Pat. No. 7,644,301. This application relates to and claims priority from Japanese Patent Application No. 2004-377176, filed on Dec. 27, 2004. The entirety of the contents and subject matter of all of the above is incorporated herein by reference.

BACKGROUND

This invention relates to data management of a storage system applying a data replication technique.

When a fault occurs in a network composed of a plurality of apparatuses, it is necessary to determine a site where the fault occurs to restore the network. However, when the network increases in scale, and its configuration becomes complicated, it is difficult to determine the site of the fault.

JP 10-22947 A discloses a network management system for determining a site where a fault occurs by allowing a management apparatus and a management apparatus agent to monitor the status of a path on the network.

SUMMARY

In the field of a recent data storage, in order to protect data stored in a storage system, data is replicated using a copy technique of a storage. According to the copy technique, a logical volume in a storage system is paired with at least one logical volume in the same or another storage system. Furthermore, those pairs can also be connected in a multistage. A pair configuration thus connected in a multistage is called a cascade configuration. By controlling the execution of data replication in each pair, replication data at an arbitrary point can be created and saved.

In such a pair configuration, because of the change in status of any pair, data of another pair may be lost. For example, when data is being replicated in one pair, and a fault occurs in that pair, the data replication is interrupted. Consequently, the logical data consistency of a logical volume of a replication destination is lost.

However, in each logical volume, backup data at a different point from that of data stored in a logical volume of a copy source may be stored. Therefore, in order to determine whether data is to be inconsistent when the status of a pair changes, it is necessary to refer to the version of the data.

Furthermore, there are a plurality of kinds in the normal status of a pair. Whether data is to be inconsistent when a fault occurs depends upon the status of a pair before the fault occurs.

Thus, data to be inconsistent when a fault occurs cannot be determined by a conventional method of determining a fault site.

According to one embodiment of this invention, there is provided a management computer connected to a storage system included in a computer system, characterized in that the storage system includes: a primary logical volume in which data is stored and an secondary logical volume in which a replication of the data stored in the primary logical volume is stored; the primary logical volume and the secondary logical volume form a pair; the management computer comprises a data management module for managing data stored in the primary and secondary logical volumes; and the data management module obtains an event regarding the pair, determines whether the event is caused by a fault occurring in the pair, determines data made to be inconsistent by the fault in the case where the event is caused by the fault, and outputs information on the inconsistent data.

According to this invention, data to be inconsistent when a fault occurs in a pair is determined. Furthermore, according to this invention, whether inconsistent data can be restored is displayed. Furthermore, this invention supports the restoration of inconsistent data.

BRIEF DESCRIPTION OF THE DRAWINGS

FIG. 5 is a diagram illustrating a pair status/application status management table according to the embodiment of this invention.

FIG. 6 is a diagram illustrating a volume/data correspondence management table according to the embodiment of this invention.

FIG. 7 is a diagram illustrating a pair configuration definition table according to the embodiment of this invention.

FIG. 9 is a diagram illustrating information on data made to be inconsistent by a fault, output by the data management program according to the embodiment of this invention.

FIG. 19 is a diagram illustrating a fault detail code table according to the embodiment of this invention.

DETAILED DESCRIPTION OF THE PREFERRED EMBODIMENTS

Figure 1:
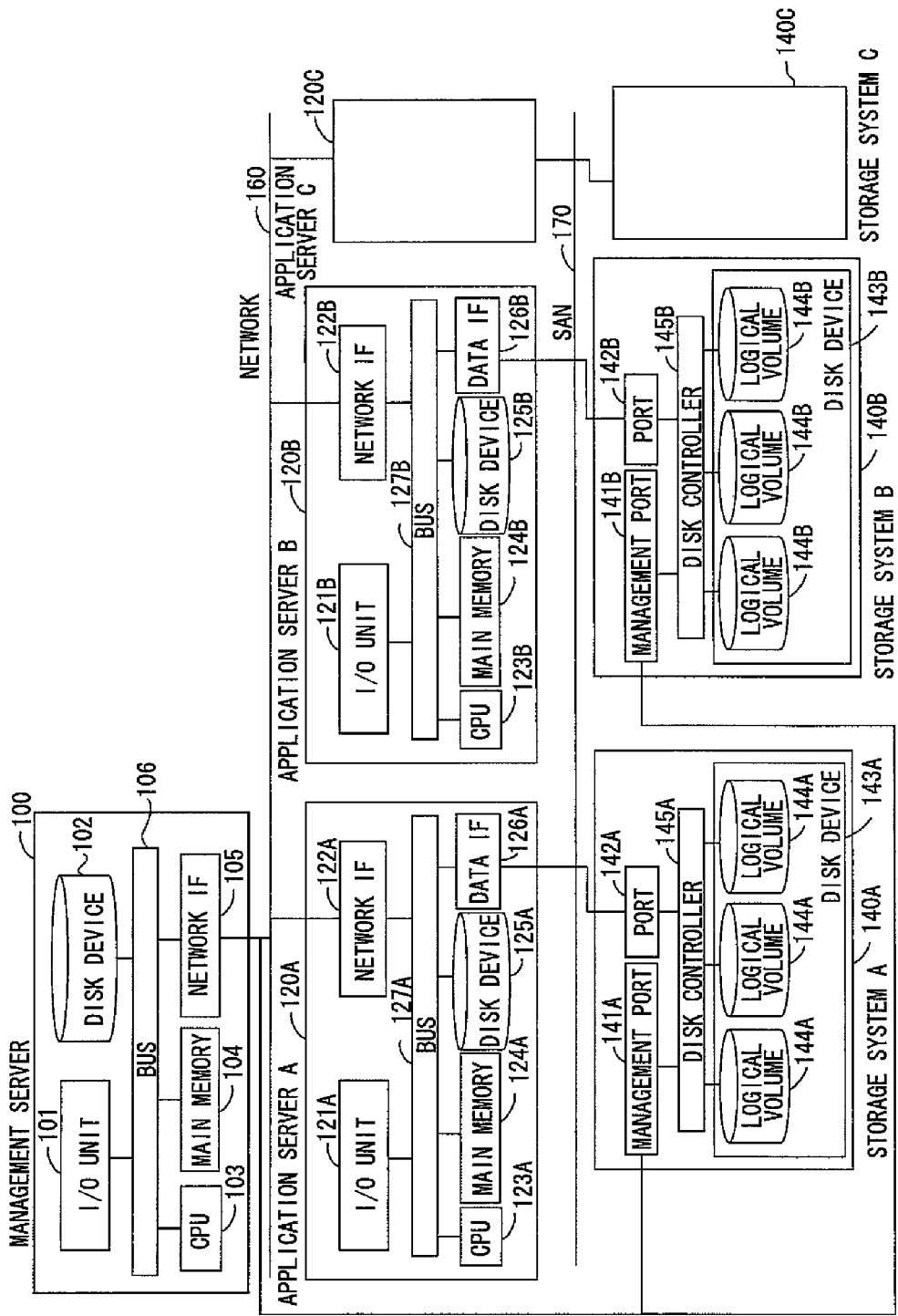
FIG. 1 is a block diagram showing a configuration of a computer system according to an embodiment of this invention.

FIG. 1 is a block diagram showing a configuration of a computer system of an embodiment of this invention.

The computer system of this embodiment is composed of a management server 100, at least one application server 120, and at least one storage system 140.

The management server 100 and the application server 120 are connected via a network 160 so as to communicate with each other. The network 160 is, for example, an IP network such as a LAN or a so-called Internet.

The application server 120 and the storage system 140 are connected to each other via a storage area network (SAN) 170 so as to communicate with each other. The SAN 170 is a network dedicated to a storage, and performs communications with an FC protocol, an FCIP protocol, or the like.

The storage system 140 may further be connected to the management server 100 and the like via the network 160 so as to communicate therewith.

The management server 100 is a computer for managing a computer system of this embodiment. The management server 100 is composed of an input/output unit 101, a disk device 102, a CPU 103, a main memory 104, a network interface (I/F) 105, and a bus 106 connecting them.

The input/output unit 101 is, for example, a display screen, a keyboard, a mouse, or the like.

Figure 2:
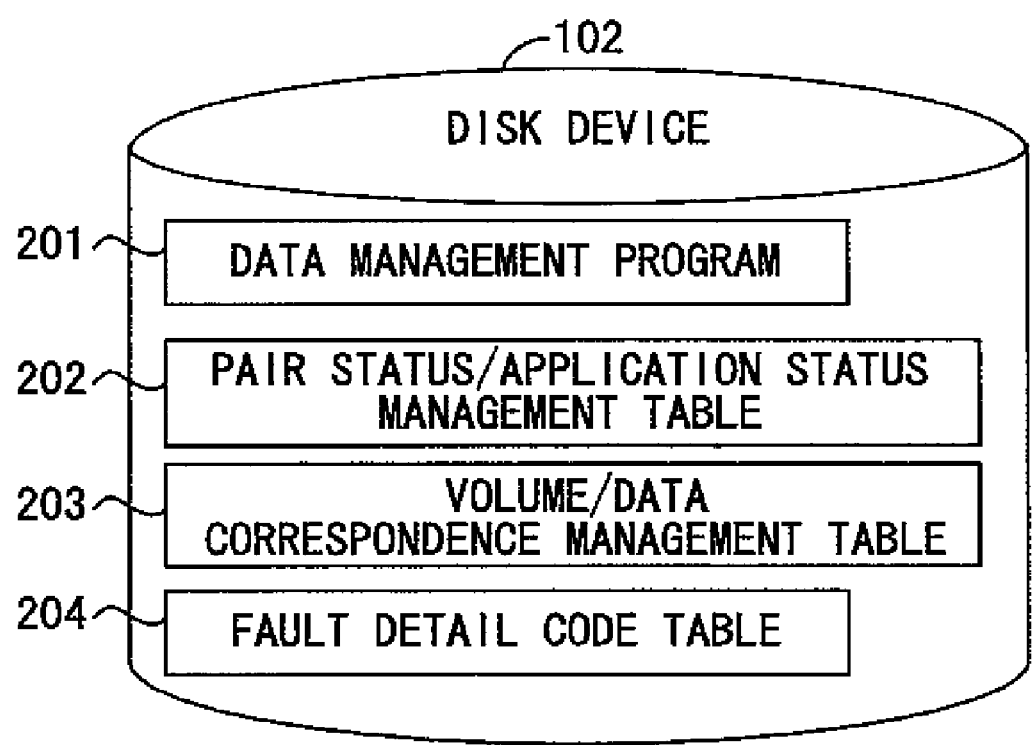
FIG. 2 is a diagram illustrating contents of a disk device in a management server according to the embodiment of this invention.

The disk device 102 is, for example, one hard disk drive, and stores a program executed by the CPU 103 and data required for executing the program, as shown in FIG. 2.

The CPU 103 is a processor for controlling the management server 100, and executes a program stored in the disk device 102.

The main memory 104 is, for example, a semiconductor memory, and used when the CPU 103 executes a program.

A network I/F 105 is an interface for the management server 100 to communicate with the application server 120 and the like via the network 160.

The application server 120 is a computer for providing a file system by using the storage system 140, and supporting transactions of a user by executing an application such as a DBMS. The application server 120 is composed of an input/output unit 121, a network I/F 122, a CPU 123, a main memory 124, a disk device 125, a data I/F 126, and a bus 127 connecting them.

The input/output unit 121 is, for example, a display screen, a keyboard, a mouse, or the like.

The network I/F 122 is an interface for the application server 120 to communicate with the management server 100 and the like via the network 160.

The CPU 123 is a processor for controlling the application server 120, and executes a program stored in the disk device 125.

The main memory 124 is, for example, a semiconductor memory, and used when the CPU 123 executes a program.

Figure 3:
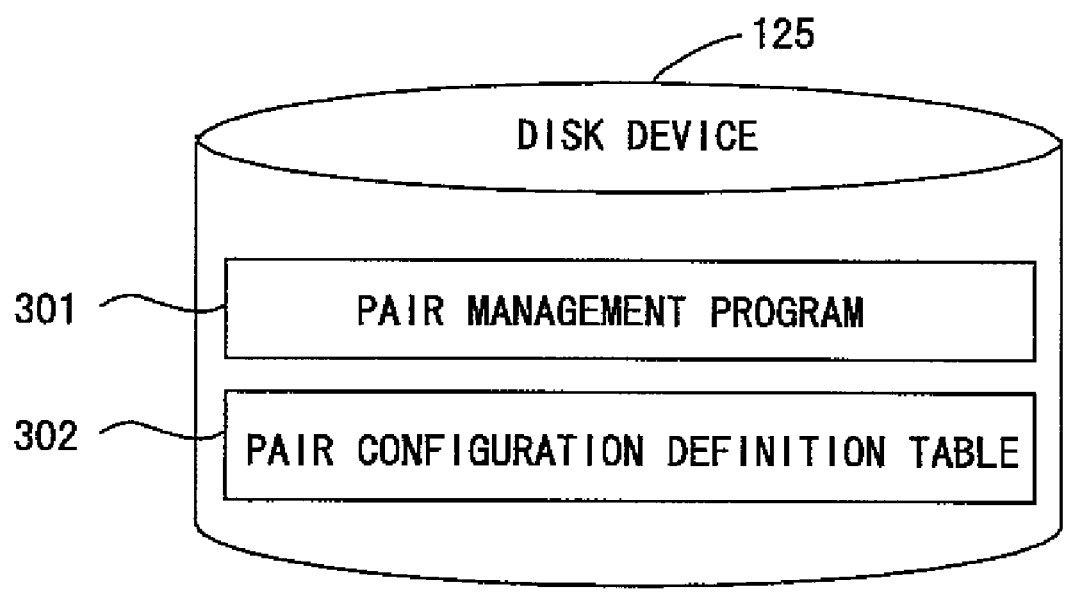
FIG. 3 is a diagram illustrating contents of a disk device in an application server according to the embodiment of this invention.

The disk device 125 is, for example, one hard disk drive, and stores a program executed by the CPU 123 and data required for executing the program, as shown in FIG. 3.

The data I/F 126 is an interface for the application server 120 to communicate with the storage system 140 and the like via the SAN 170.

Although the configuration of the application server 120C is not shown, it is similar to those of the application servers 120A and 120B. The computer system of this embodiment may include more application servers 120.

The storage system 140 stores data according to a request from the application server 120.

The storage system 140 is composed of a management port 141, a port 142, a disk device 143, and a disk controller 145 for controlling them.

The management port 141 is an interface for the storage system 140 to communicate with the management server 100 and the like via the network 160. The storage system 140 may not be connected to the network 160. In the case where the storage system 140 is not connected to the network 160, the management port 141 may not be provided.

The port 142 is an interface for the storage system 140 to communicate with the application server 120 and the like via the SAN 170.

A logical volume 144 may be composed of a plurality of hard disk drives (for example, RAID). In this embodiment, each logical volume 144 is assumed to be a RAID composed of a plurality of hard disk drives.

The logical volume refers to a storage region logically dealt with as one disk drive. Data used by the application server 120 in the storage system 140 is stored in the logical volume 144.

Although the configuration of the storage system 140C is not shown, it is similar to those of the storage systems 140A and 140B. The computer system of this embodiment may include more storage systems 140.

Data stored in the logical volume 144 of the storage system 140 can be replicated (copied) to the logical volume 144 of another storage system 140 via the SAN 170 without using the application server 120. Such data replication is called a remote copy. Furthermore, data stored in the logical volume 144 of the storage system 140 can also be replicated to another logical volume 144 of the same storage system 140. Such data replication is called a local copy.

As described above, in the case where data is replicated between the logical volumes 144, a combination of the logical volume 144 of a replication source and the logical volume 144 of a replication destination is called a pair. The logical volume 144 of a replication source is called a primary logical volume (PVOL), and the logical volume 144 of a replication destination is called a secondary logical volume (SVOL).

FIG. 2 is a diagram illustrating contents of the disk device 102 of the management server 100 of the embodiment of this invention.

The disk device 102 stores at least a data management program 201, a pair status/application status management table 202, a volume/data correspondence management table 203, and a fault detail code table 204. The configurations of the program and tables will be described later in detail.

FIG. 3 is a diagram illustrating contents of the disk device 125 of the application server 120 of the embodiment of this invention.

At least one of the application servers 120 connected to the storage system 140 stores a pair management program 301 and a pair configuration definition table 302.

The pair management program 301 executes a pair operation for switching the status of a pair of the logical volumes 144 in response to an instruction from the management server 100 or the like.

A pair has five statuses: "PAIR", "SUSPEND", "COPY", "REVERSE-COPY", and "ERROR".

The "PAIR" is a status in which the same data is stored (i.e., data is duplexed) in the PVOL and the SVOL as a result of data replication. When data in the PVOL of the pair in the "PAIR" status is updated, the updated data is replicated to the SVOL by data replication (local copy or remote copy). Consequently, the data consistency between the PVOL and the SVOL is maintained. In the case where synchronous copy is performed, the identity of the data in the PVOL and the SVOL is maintained in the "PAIR" status (mirroring).

The "SUSPEND" is a status in which data replication is stopped as a result of a pair operation "SPRIT" described later. Even if the data in the PVOL of the pair in the "SUSPEND" status is updated, the updated data is not replicated to the SVOL. Therefore, in the PVOL and the SVOL of the pair in the "SUSPEND" status, different data may be stored.

The "COPY" and the "REVERSE COPY" are statuses in which data replication for switching the "SUSPEND" status to the "PAIR" status is being performed (i.e., status in which data replication has been started and has not been completed). The "COPY" is a status in which data replication from the PVOL to the SVOL is performed. The "REVERSE COPY" is a status in which data replication from the SVOL to the PVOL is performed.

The "ERROR" is a status in which data replication is stopped as a result of the occurrence of a fault. Herein, the fault refers to, for example, a network fault occurring in the SAN 170 or a fault occurring in the storage system 140. In the pair in the "ERROR" status, similar to in the "SUSPEND" status, data replication is not performed. Therefore, the "ERROR" status is also called a "SUSPEND ERROR". Thus, in the PVOL and the SVOL of the pair in the "ERROR" status, different data may be stored.

The pair management program 301 performs three pair operations: "SPLIT", "RESYNC", and "REVERSE-RESYNC". The "REVERSE-RESYNC" is also called "RESTORE".

When the "SPLIT" is performed in the pair in the "PAIR" status, the pair is placed in the "SUSPEND" status.

When the "RESYNC" is performed in the pair in the "SUSPEND" status, the pair is placed in the "COPY" status, and the data in the PVOL is replicated to the SVOL. When the replication is completed, the pair is placed in the "PAIR" status.

As described later, in the case where the degree of a fault occurring in a pair is small, the "RESYNC" can be performed in the pair in the "ERROR" status ("SUSPEND ERROR" status). The result of the execution is the same as that obtained when the "RESYNC" is performed in the pair in the "SUSPEND" status. More specifically, the pair in the "ERROR" status in which the "RESYNC" is performed is placed in the "COPY" status, and the data in the PVOL is replicated to the SVOL. When the replication is completed, the pair is placed in the "PAIR" status.

When the "RESTORE" is performed in the pair in the "SUSPEND" status, the pair is placed in the "REVERSE-COPY" status, and the data in the SVOL is replicated to the PVOL. When the replication is completed, the pair is placed in the "PAIR" status.

The pair management program 301 may detect that the status of a pair has been changed, and notify the management server 100 of the change. Specifically, when another software performs a pair operation and a fault occurs in a pair, as well as when the pair management program 301 performs a pair operation, the pair management program 301 notifies the management server 100 that the status of the pair has been changed and of the changed status of the pair.

The storage system 140 may directly notify the management server 100 of the change in the status of the pair via the management port 141.

The pair management program 301 may further detect that the status of an application has been changed, and notify the management server 100 of the change. Specifically, the pair management program 301 detects that an application has been staticized (in other words, an application has been made to be quiescent) or a staticized application has been destaticized with respect to any of the logical volumes 144, and notifies the management server 100 that the status of the application has been changed and the changed status of the application.

The pair configuration definition table 302 includes information regarding a pair to which each logical volume in the storage system 140, to which the application server 120 is connected, belongs. The pair configuration definition table 302 will be described later in detail referring to FIG. 7.

The pair management program 301 and the pair configuration definition table 302 may be stored in the disk device 102 of the management server 100. In this case, the pair management program 301 performs a pair operation of the logical volume 144 in the storage system 140 via the management port 141 connected to the network 160.

Figure 4:
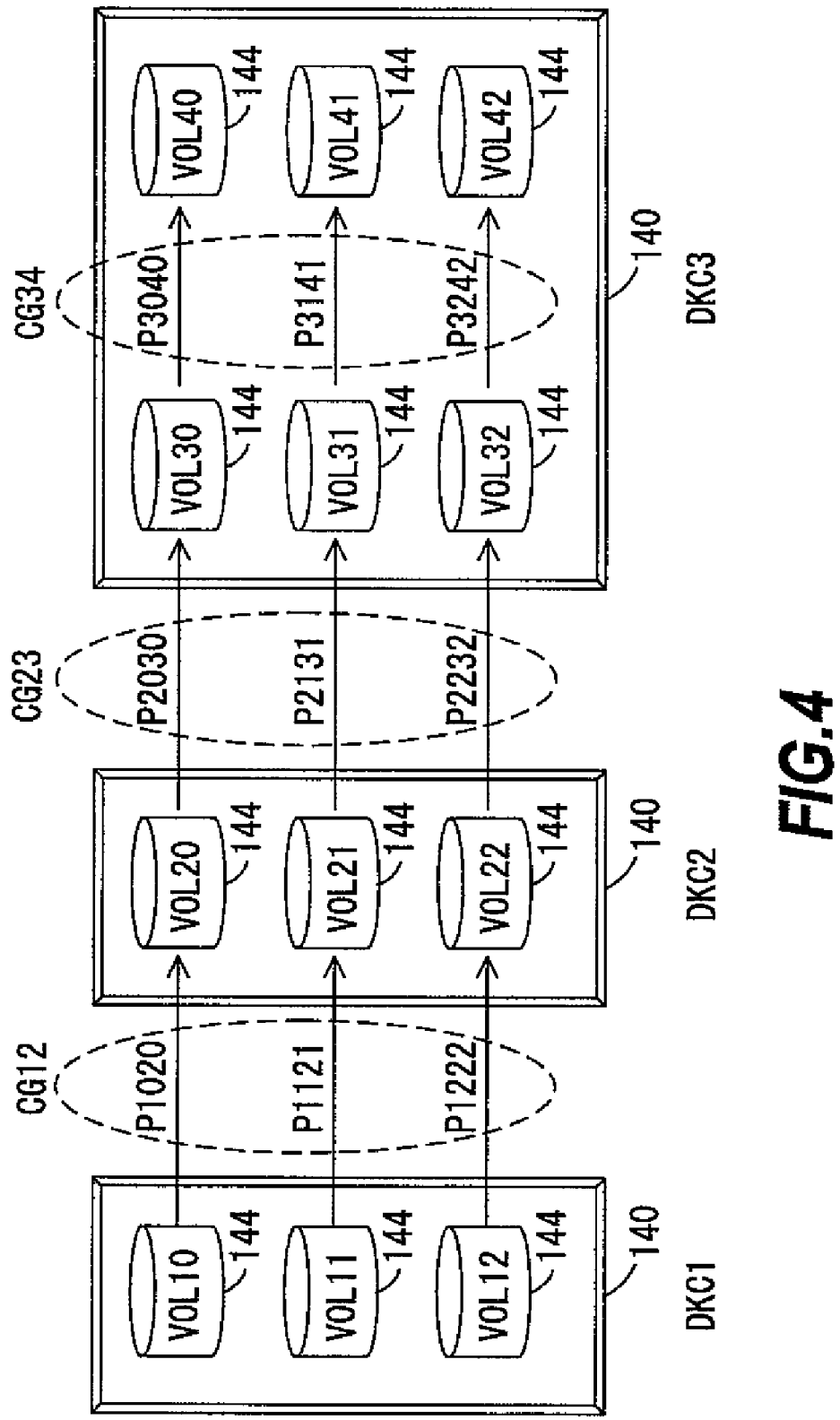
FIG. 4 is a diagram illustrating pairs and copy groups for data replication in the embodiment of this invention.

FIG. 4 is a diagram illustrating pairs and copy groups for data replication in the embodiment of this invention.

In the example shown in FIG. 4, DKC (disk controller)1, DKC2, and DKC3 are storage systems 140. For example, the DKC1, DKC2, and DKC3 may be storage systems 140A, 140B, and 140C, respectively. In FIG. 4, the SAN 170, the application server 120, and the like are not shown.

The DKC1 includes three logical volumes 144: VOL10, VOL11, and VOL12. The DKC2 includes three logical volumes 144: VOL20, VOL21, and VOL22. The DKC3 includes six logical volumes 144: VOL30, VOL31, VOL32, VOL40, VOL41, and VOL42.

The data in the VOL10 is replicated to the VOL 20 between the DKC1 and the DKC2. In other words, the VOL10 and the VOL20 forms a pair. Herein, the VOL10 is PVOL, and the VOL20 is SVOL. The pair formed by the VOL10 and the VOL20 is referred to as a pair P1020.

Similarly, the VOL11 and the VOL21 forms a pair P1121. Herein, the VOL11 is PVOL, and the VOL21 is SVOL.

The VOL12 and the VOL22 forms a pair P1222. Herein, the VOL12 is PVOL, and the VOL22 is SVOL.

These three pairs are those which are formed by the remote copy between the DKC1 and the DKC2.

The pairs P1020, P1121, and P1222 form a copy group CG12. The copy group refers to a collection of pairs, and can be set to be a unit for a pair operation. Although a pair operation can be performed with respect to each pair, a plurality of pair operations can also be performed collectively by determining a copy group. In the case where a copy group ensures data consistency, in one copy group, when PVOLs are updated, SVOLs are updated in the order of the update of the PVOLs. For example, in the case where data A (not shown) in the VOL10 is updated and then data B (not shown) in the VOL11 is updated, the data A is replicated from the VOL10 to the VOL20, and then the data B is replicated from the VOL11 to the VOL21. Thus, the update order of data is maintained, whereby the mutual consistency of data in a copy group is maintained.

For example, a plurality of pairs regarding one instance of one application may be set to be one copy group, and a plurality of pairs regarding one database may be set to be one copy group.

Similarly, the VOL20, VOL21, and VOL22 respectively form pairs P2030, P2131, and P2232 by the remote copy, together with the VOL30, VOL31, and VOL32. In these pairs, the VOL20, VOL21, and VOL22 are PVOLs, and the VOL30, VOL31, and VOL32 are SVOLs. These three pairs form a copy group CG23.

Further, the VOL30, VOL31, and VOL32 respectively form pairs P3040, P3141, and P3242 by the local copy, together with the VOL40, VOL41, and VOL42. In these pairs, the VOL30, VOL31, and VOL32 are PVOLs, and the VOL40, VOL41, and VOL42 are SVOLs. These three pairs form a copy group CG34.

In a copy path extending from the DKC1 to the DKC3, a PVOL side is defined as an upper stage, and an SVOL side is defined as a lower stage. For example, based on the pair P2030, the pair P1020 is in an upper stage, and the pair P3040 is in a lower stage. The pair P1020 is adjacent to the upper stage of the pair P2030, and the pair P3040 is adjacent to the lower stage of the pair P2030. On the other hand, the pair P1020 is in the upper stage of the pair P3040, and is not adjacent to the pair P3040.

Referring to FIG. 4, the summary of this invention will be described next. Herein, although only the VOL10, VOL20, VOL30, and VOL40 will be described, the descriptions are also applied to another logical volume 144.

In the case where the pair status of all the pairs shown in FIG. 4 are in the "PAIR", for example, when the application server 120 updates the data in the VOL10 of the DKC1, the update is reflected to the VOL20 and the VOL30 by the remote copy, and further is reflected to the VOL40 by the local copy. Consequently, the same data is stored in the VOL10, VOL20, VOL30, and VOL40.

Next, when the "SPLIT" is performed with respect to the pair P2030, the pair status of the pair P2030 is placed in the "SUSPEND", whereby the remote copy of the pair P2030 is suspended.

Thereafter, when the data in the VOL10 is updated, the update is reflected to the VOL20 by the remote copy. However, since the remote copy of the pair P2030 is suspended, the update is not reflected to the VOL30 and the VOL40. Consequently, the data stored in the VOL10 and the VOL20 is not the same as that stored in the VOL30 and the VOL40.

At this time, when a fault occurs in the pair P1020, as long as the application is not suspended, the logical consistency of the data stored in the VOL20 cannot be ensured (although consistency may be kept in some cases, it cannot be ensured). Since the data whose consistency is not ensured cannot be used, the data in the VOL20 is lost.

On the other hand, in the case where the pair P1020 is normal, when the "RESYNC" is performed with respect to the pair P2030, the pair status is placed in the "COPY", and the data in the VOL20 is replicated to the VOL30. When the replication is completed, the pair status is placed in the "PAIR". At this time, among the data stored in the VOL30 before the commencement of the replication, the data different from that in the VOL20 is lost when the data in the VOL20 is overwritten.

Furthermore, since the pair status of the pair P3040 is in the "PAIR", the update of the VOL30 is reflected to the VOL40. Consequently, among the data stored in the VOL40, the data different from that in the VOL20 is lost when the data in the VOL20 is overwritten.

Furthermore, in the case where a fault occurs in the pair P2030 when the pair status is in the "COPY" and replication of data is suspended, the consistency of the data stored in the VOL 30 is not ensured. Therefore, the data in the VOL30 is lost (more specifically, the data in the VOL30 is to be inconsistent).

Furthermore, since the pair status of the pair P3040 is in the "PAIR", the update of the VOL30 is reflected to the VOL40.

In other words, the data whose consistency is not ensured is replicated from the VOL30 to the VOL40. Consequently, the data in the VOL40 is also lost.

When a pair status is changed by a fault or a pair operation, the data management program 201 of this invention determines data to be inconsistent or data to be overwritten by the change and notifies a user of the data.

FIG. 5 is a diagram illustrating the pair status/application status management table 202 of the embodiment of this invention.

The pair status/application status management table 202 includes information for managing data in the logical volume 144, and is referred to by the data management program 201.

FIG. 5 shows contents of the pair status/application status management table 202 in the case where the pairs and the copy groups as shown in FIG. 4 are present in the computer system shown in FIG. 1. One row of the pair status/application status management table 202 corresponds to one pair present in the storage system 140 managed by the management server 100.

In FIG. 5, a PVOL 501 and a SVOL 502 are names of a PVOL and an SVOL forming each pair. In the PVOL 501 and the SVOL 502, "VOL10", "VOL20", and the like are described.

A copy group name 503 is a name of a copy group to which each pair belongs. In the copy group name 503, "CG12" and the like are described.

A pair name 504 is a name of each pair. In the pair name 504, "P1020" and the like are described.

A pair status 505 is a pair status of each pair. In the pair status 505, the "PAIR", "SUSPEND", "COPY", or "ERROR" is described. In the example shown in FIG. 5, the pair statuses of the pairs P2030, P2131, and P2232 are in the "SUSPEND", and the pair statuses of the other pairs are in the "PAIR". This shows that, in FIG. 4, the remote copy or the local copy is performed in the pairs belonging to the copy groups CG12 and CG34, and the remote copy of the pairs belonging to the copy group CG23 is suspended.

The application 506 shows a pair including the logical volume 144 in which the application is performed by the application server 120 (i.e., which receives data I/O directly from the application server 120). In the example shown in FIG. 5, since the application server 120 using the DKC1 performs an application, "O" is described with respect to the pairs including the VOL10, VOL11, and VOL12.

A static flag 507 shows whether an application is staticized. Staticization refers to the suspension of (direct or indirect) data access (I/O) from the application server 120 to the logical volume 144. When the application is staticized, "O" is described with respect to the pairs directly providing the application. It should be noted that only the pairs in which "O" is described in the application 506 are targeted for description.

FIG. 6 is a diagram illustrating the volume/data correspondence management table 203 of the embodiment of this invention.

The volume/data correspondence management table 203 includes information for managing data in the logical volume 144, and is referred to by the data management program 201.

FIG. 6 shows contents of the volume/data correspondence management table 203 in the case where the pairs and the copy groups as shown in FIG. 4 are present in the computer system shown in FIG. 1, in the same way as in FIG. 5. One row of the volume/data correspondence management table 203 corresponds to one logical volume 144 present in the storage system 140 managed by the management server 100.

In FIG. 6, a volume 601 is a name of each logical volume 144. In the volume 601, the "VOL10", "VOL20", and the like are described.

A data name 602 is a name for identifying data to be stored in each logical volume 144. The data is identified, for example, based on an application by which the data is created, the application server 120 performing the application, and the name of an instance.

In the example shown in FIG. 6, the data in the VOLs10 to 12 are created by the application of "SQL server" of the application server 120 called "HOST1", and the instance name is "SQL instance 01". The "HOST1" is a name of the application server 120 using the DKC1.

The VOLs20 to 22 are replications of the VOLs10 to 12. Therefore, the data names 602 of the VOLs20 to 22 are the same as those of the VOLs10 to 12. This also applies to the VOLs30 to 32 and the VOLs40 to 42. In the case where an instance name is changed or the like, the data name 602 in the upper stage is not necessarily matched with that in the lower stage.

An application staticized time 603 is a time when the application is staticized with respect to each logical volume 144. In FIG. 6, the VOLs10 to 12 and the VOLs20 to 22 are not staticized (in other words, data write processing to each of these logical volumes is not suspended), so the "LATEST" is described in the application staticized time 603. On the other hand, since the VOLs30 to 32 and the VOLs40 to 42 are staticized (in other words, data write processing to each of these logical volumes is suspended), a staticized time ("0:00 on May 10, 2004" in the example shown in FIG. 6) is described in the application staticized time 603.

The data name 602 and the application staticized time 603 can be used as an identifier of data. In other words, the contents of data with the same data name 602 and the same application staticized time 603 are the same.

A backup ID 604 is an identifier of backup. The value of the backup ID 604 is given when the application is staticized with respect to each logical volume 144. The same backup ID 604 is given to the logical volumes 144 having the same data name 602 and the same application staticized time 603. On the other hand, different backup IDs 604 are given to the logical volumes 144 in which at least one of the data name 602 and the application staticized time 603 is different. In FIG. 6, the VOLs10 to 12 and the VOLs20 to 22 are not staticized, so the backup ID604 is vacant. On the other hand, since the VOLs30 to 32 and the VOLs40 to 42 are staticized, a backup ID ("BID001" in the example shown in FIG. 6) given when they are staticized is described in the backup ID 604.

Data can also be identified uniquely based on a combination of the data name 602 and the application staticized time 603, in place of the backup ID 604, so the backup ID 604 is not necessary.

The application volume 605 corresponds to the logical volume 144 that receives data I/O from the application server 120, among the logical volumes 144 in a copy path including each logical volume 144.

The copy path refers to a sequence of pairs connected in a cascade shape. For example, in FIG. 4, the P1020, P2030, and P3040 connected in a cascade shape correspond to one copy path.

In FIG. 4, the VOL10, VOL20, VOL30, and VOL40 belong to the same copy path. Among these logical volumes 144, the VOL10 receives data I/O from the application server 120. Therefore, the application volume 605 of the VOL40 is the VOL10. Similarly, the application volume 605 of the VOL30 and the VOL20 is also the VOL10.

On the other hand, the application volume 605 of the VOL21, VOL31, and VOL41 is the VOL11. Furthermore, the application volume 605 of the VOL22, VOL32, and VOL42 is the VOL12.

The volume/data correspondence management table 203 may include information on a mount point with respect to each logical volume 144.

FIG. 7 is a diagram illustrating the pair configuration definition table 302 of the embodiment of this invention.

FIG. 7 is the pair configuration definition table 302 of the application server 120 using the DKC1 in the example shown in FIG. 4.

In FIG. 7, a volume 701 is a name of a logical volume included in the DKC1. In the example shown in FIG. 7, in the volume 701, the "VOL10", "VOL11", and "VOL12" are described.

A copy group name 702 is a name of a copy group to which each logical volume 144 belongs. In the example shown in FIG. 7, "CG12" is described in the copy group name 702 of the VOL10 to VOL12.

A pair name 703 is a name of a pair to which each logical volume 144 belongs. In the example shown in FIG. 7, the "P1020", "P1121", and "P1222" are described respectively in the pair name 703 of the VOL10, VOL11, and VOL12.

The pair configuration definition table 302 of the application server 120 using the DKC2 and the DKC3 is not shown. However, in the pair configuration definition table 302 of the application server 120, the names of the logical volumes 144 included in the DKC2 or the DKC3 and the name of a copy group and a pair to which they belong are described.

The pair configuration definition table 302 is referred to when the management server 100 creates the pair status/application status management table 202 and the volume/data correspondence management table 203, and when these tables are updated to the latest contents.

Figure 8:
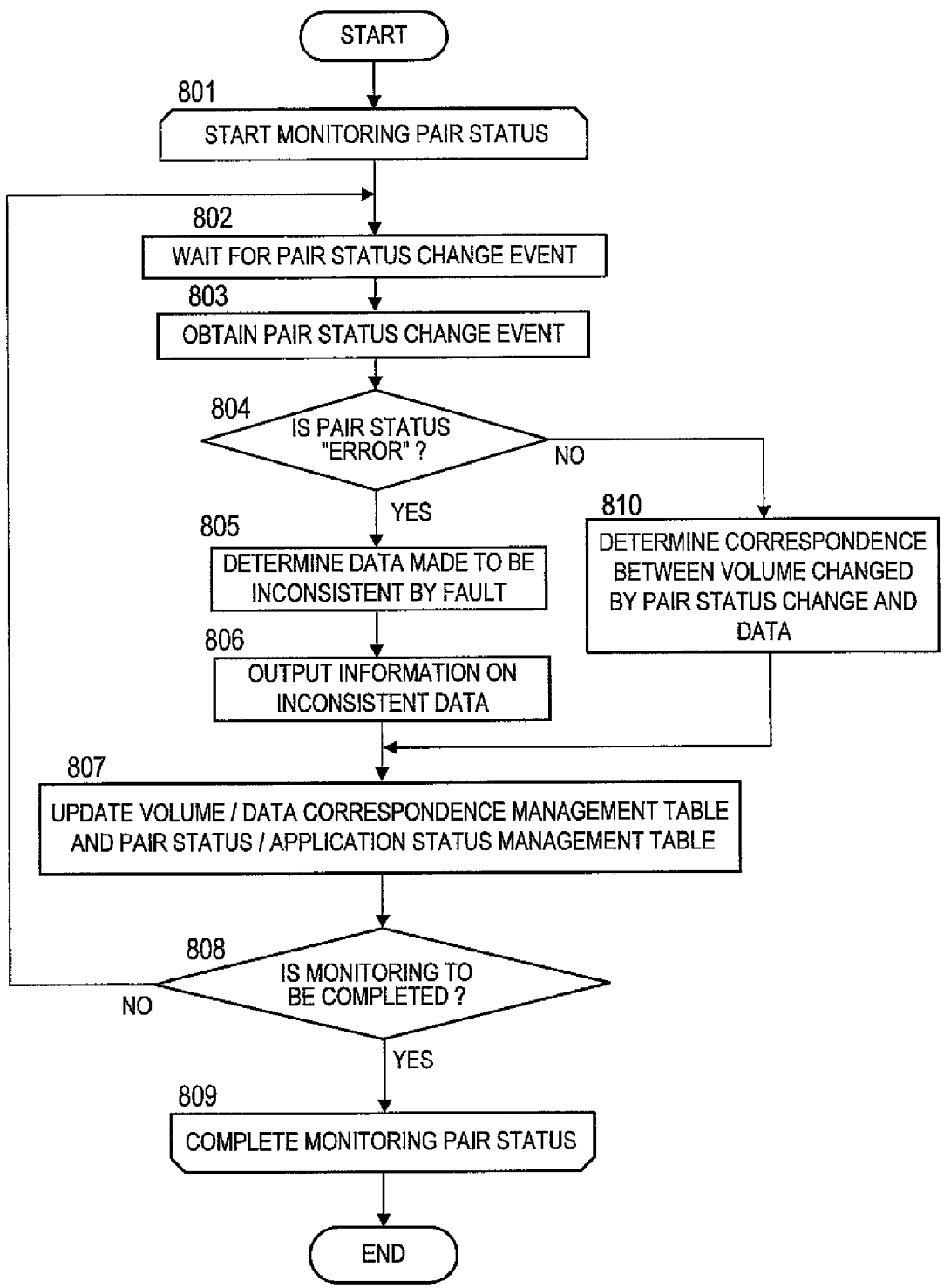
FIG. 8 is a flow chart of processing performed by a data management program when a pair status is changed in the computer system according to the embodiment of this invention.

FIG. 8 is a flow chart of processing performed by the data management program 201 when the pair status is changed in the computer system of the embodiment of this invention.

Herein, the case where the pair status is changed includes the case where a fault occurs in a pair, and the case where a user allows the pair management program 301 to perform a pair operation.

As the precondition for performing the processing in FIG. 8, it is necessary that the contents of the pair status/application status management table 202 and the volume/data correspondence management table 203 are latest. Specifically, the management server 100 obtains information related to the contents of these tables from each application server 120, and updates these tables. Alternatively, the user may operate the input/output unit 101 of the management server 100 to update these tables. This update may be performed before or after a request for monitoring a pair status is received from the user.

Figure 13:
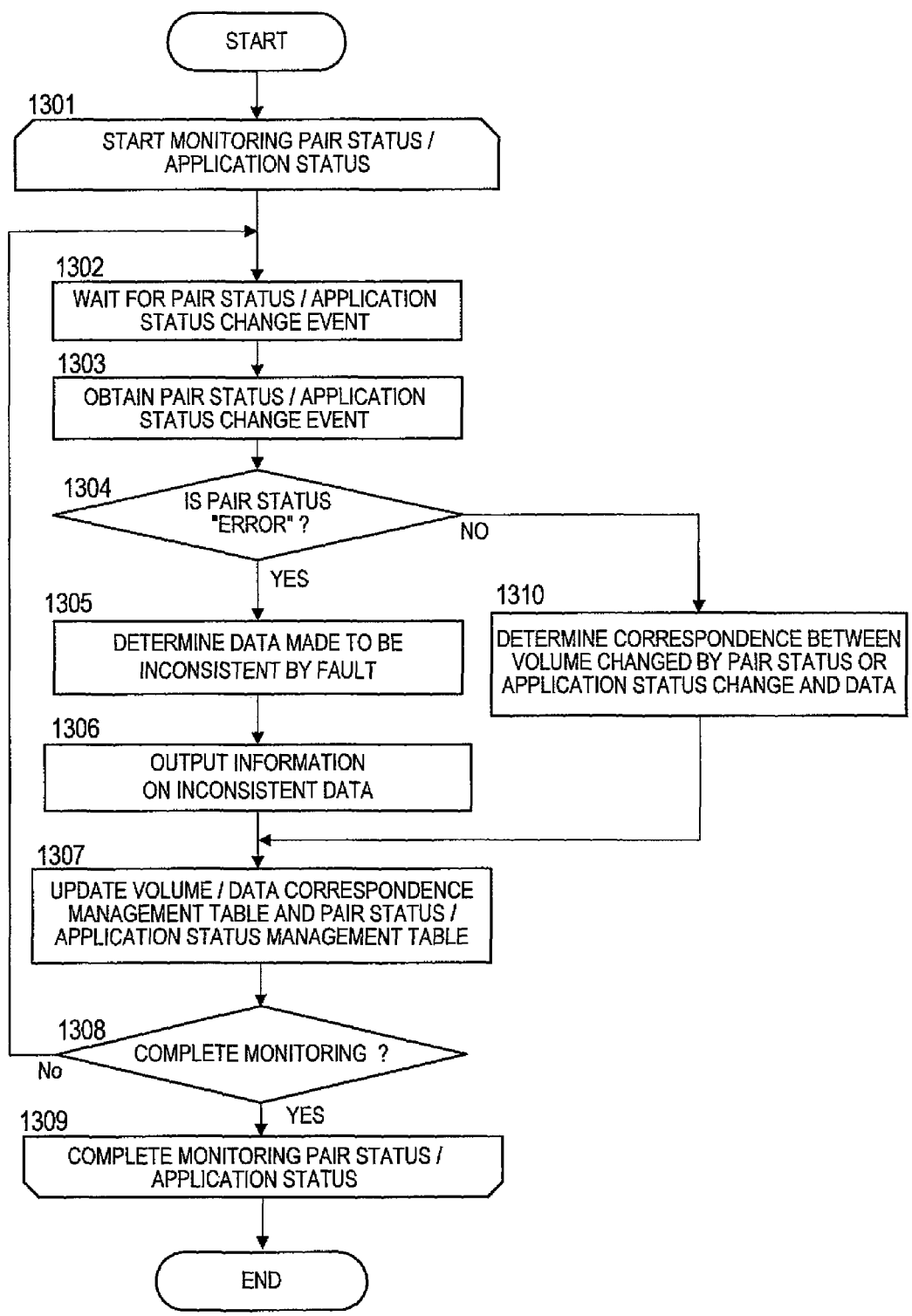
FIG. 13 is a flow chart of processing performed by the data management program when the pair status or an application status is changed in the computer system according to the embodiment of this invention.

In this embodiment, as described later in detail, when the pair status or the application status is changed, the processing shown in FIG. 8 or FIG. 13 is performed. Consequently, the contents of the pair status/application status management table 202 and the volume/data correspondence management table 203 are updated to latest values. Thus, according to this embodiment, the latest values are always stored in these tables.

The processing in FIG. 8 is started when the user requests the management server 100 to monitor a pair status.

Upon receiving a request for monitoring a pair status from the user, the data management program 201 starts monitoring a pair status (801). Then, the data management program 201 waits for a pair status change event (802). Specifically, the data management program 201 waits for the reception of a notification of a change in pair status from the pair management program 301 in the application server 120.

When obtaining a pair status change event (i.e., receiving a notification of a change in pair status) (803), the data management program 201 determines whether the pair status after the change is in the "ERROR" (804).

In the step 804, when the data management program 201 determines that the changed pair status is in the "ERROR", a fault occurs in a pair whose pair status has been changed. Therefore, the data management program 201 then determines data made to be inconsistent by the fault occurring in the pair (805). At this time, the pair status before the occurrence of the fault in the pair, the pair status of each pair in a copy path including the pair in which the fault occurs, and an application status are referred to. The procedure of processing in the step 805 will be described later in detail with reference to FIG. 10.

Next, the data management program 201 outputs information on data determined in the step 805 (i.e., data made to be inconsistent by the fault) (806). Specifically, the data management program 201 outputs information such as the name (identifier) of the data, the application staticized time thereof, the name (identifier) of a storage system in which the data is stored, and the like is output from the input/output unit 101 of the management server 100. The information output at this time will be described later in detail with reference to FIG. 9.

On the other hand, in the step 804, in the case where the data management program 201 determines that the changed pair status is not in the "ERROR", the pair status has been changed by the execution of a pair operation in the pair. Therefore, the data management program 201 determines the correspondence relationship between the logical volume 144 changed by the pair operation and the data stored in the logical volume 144 (810). At this time, the pair status before the execution of the pair operation, the pair status of each pair in a copy path including the pair in which the pair operation is executed, and the application status thereof are referred to. The procedure of processing in the step 810 will be described later in detail with reference to FIG. 11.

After performing the step 806 or 810, the data management program 201 updates the contents of the pair status/application status management table 202 and the volume/data correspondence management table 203 so that they are matched with the changed pair status (807). The procedure of the update will be described later in detail with reference to FIG. 12.

Next, the data management program 201 determines whether to complete the monitoring of a pair status (808). Specifically, the data management program 201 determines, for example, whether the user has input an instruction of completing the monitoring of a pair status.

In the step 808, in the case where the data management program 201 determines not to complete the monitoring of a pair status, the data management program 201 returns to the step 802 so as to continue to monitor a pair status.

On the other hand, in the step 808, in the case where the data management program 201 determines to complete the monitoring of a pair status, the data management program 201 completes the monitoring of a pair status (809), whereby the processing in FIG. 8 is completed.

As described above, according to the processing in FIG. 8, when a pair status is changed, the processing of determining data to be inconsistent or data to be overwritten is performed with the detection of the change as a trigger. Therefore, even in the case where a fault occurs in a pair or a pair status is changed by another application program or the like, as well as when the user performs a pair operation using the pair management program 301, the processing shown in FIG. 8 is performed, and data to be inconsistent or data to be overwritten is determined.

FIG. 9 is a diagram illustrating information on data made to be inconsistent by a fault, output by the data management program 201 of the embodiment of this invention.

FIG. 9 shows information output in the step 806 shown in FIG. 8, when a fault occurs in the pair between the DKC1 and the DKC2 in the example shown in FIGS. 4, 5, and 6. When a fault occurs in the pair between the DKC1 and the DKC2, the data stored in the logical volume 144 in the DKC2 is inconsistent. Thus, in the step 806 shown in FIG. 8, the information on the data stored in the logical volume 144 in the DKC2 is output.

The relationship among a pair in which a fault occurs, the pair status of the pair, and the data made to be inconsistent by the fault will be described later in detail with reference to FIG. 10.

Among the information 900 on the data to be inconsistent, an output information type 901 represents the kind of information to be output, and includes a data name 903, an application staticized time 904, and a storage system name 905.

The data name 903 further includes an application server name 906, an application name 907, and an instance name 908. In the case where the application is a file system, the data name 903 includes the application server name 906, a file system name (not shown), and a mount point (not shown). The data name 903 may include other information for identifying data to be inconsistent. The storage system name 905 is classified into a local 909 and a remote 910.

A content 902 corresponds to the output information type 901. In the example shown in FIG. 9, data to be inconsistent is the data in the VOLs20 to 22 shown in FIG. 6. Thus, the content 902 of the data name 903 is the same as that of the data name 602 of the logical volume 144 thereof. Specifically, the application server name 906 is "HOST1", the application name 907 is "SQL server", and the instance name is "SQL instance 01".

Similarly, the content 902 of the application staticized time 904 is "LATEST" in the same way as in the application staticized time 603 shown in FIG. 6.

The content 902 of the storage system name 905 is a name (identifier) of the storage system 140 in which data to be inconsistent is stored. Herein, one row corresponds to one logical volume in which data to be inconsistent is stored.

The storage system name 905 is classified into the local 909 and the remote 910. The local 909 is the storage system 140 in which a logical volume used directly for an application by the application server 120 is stored, and the remote 910 is the storage system 140 different from the storage system 140 in which the logical volume used directly for an application is stored. The remote 910 may be connected by the remote copy in a plurality of stages.

In the example shown in FIG. 4, the DKC1 is used for an application by the application server 120, so the storage system name 905 of the DKC1 is classified into the local 909. The DKC2 and the DKC3 are not used for the application by the application server 120, so the storage system name 905 of the DKC2 and the DKC3 is classified into the remote 910.

According to FIGS. 4 and 6, the data to be inconsistent is not stored in the DKC1. Therefore, the content 902 of the local 909 is vacant.

According to FIGS. 4 and 6, the data to be inconsistent is stored in the DKC2. Therefore, the content 902 of the remote 910 is an identifier of the DKC2. Specifically, in the content 902, the name (identifier) of the storage system 140 including the logical volume 144 in which the data to be inconsistent is stored is described.

"Abc13468@192.16.1.1" is an identifier of the DKC2. "(REMOTE COPY)" shows that the data stored in the DKC2 is replicated from another storage system 140 (DKC1 in this case) by the remote copy.

The information 900 on the data to be inconsistent may be output from the input/output unit 101 as text data. Alternatively, for example, the information 900 may be output together with the drawings such as a figure showing a configuration of a computer system and the like.

Figure 10:
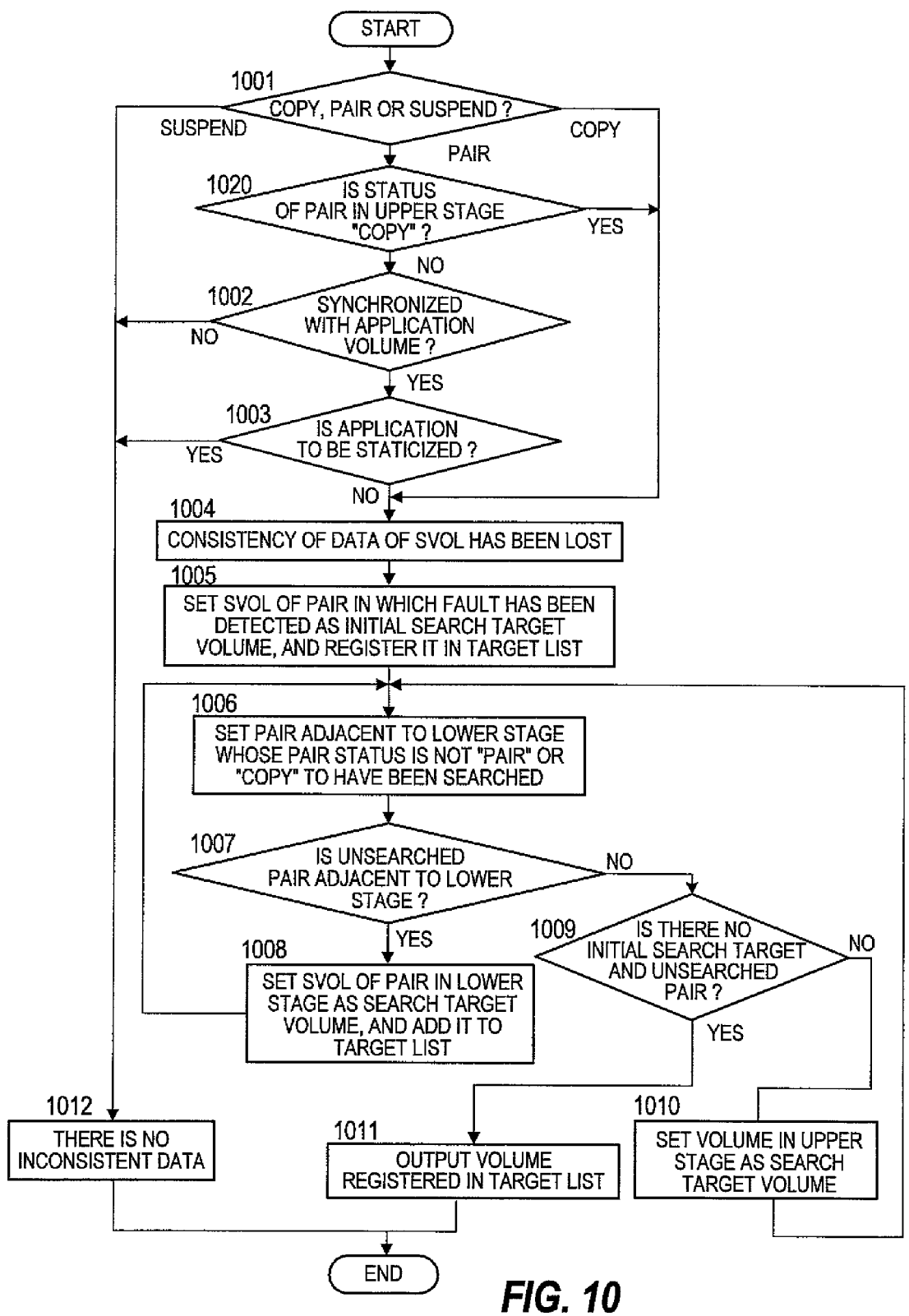
FIG. 10 is a flow chart of processing for determining the data to be made to be inconsistent by a fault when the fault occurs in a pair according to the embodiment of this invention.

FIG. 10 is a flow chart of the processing for determining the data to be made to be inconsistent by a fault when the fault occurs in a pair of the embodiment of this invention.

The processing in FIG. 10 is performed by the data management program 201 in the step 805 in FIG. 8.

When the processing in FIG. 10 is started, the data management program 201 determines whether the pair status immediately before the occurrence of a fault is in the "COPY", "PAIR", or "SUSPEND" (1001). Specifically, the data management program 201 refers to the pair status 505 of the pair status/application status management table 202 with respect to the pair in which the fault occurs.

In the case where the data management program 201 determines that the pair status immediately before the occurrence of a fault is in the "SUSPEND", the consistency of the data in the SVOL of the pair is not lost by the fault. Therefore, the data management program 201 determines that the data is not inconsistent (1012) and completes the processing.

On the other hand, in the case where the data management program 201 determines that the pair status immediately before the occurrence of a fault is in the "COPY", the consistency of the data in the SVOL of the pair is lost by the fault. Therefore, the process proceeds to a step 1004.

On the other hand, in the case where the data management program 201 determines that the pair status immediately before the occurrence of a fault is in the "PAIR", the consistency of the data in the SVOL of the pair may be lost by the fault.

Therefore, the data management program 201 then determines whether data has been written in the pair in which the fault has occurred (or there is a possibility that data has been written) (1020, 1002). The reason for this is as follows. When data is written in the pair in which the fault has occurred, there is a possibility that the consistency of the data in the SVOL of the pair may be lost.

In the step 1020, the data management program 201 determines whether a pair whose pair status is in the "COPY" is present in the upper stage of the pair in which the fault has occurred. Specifically, the data management program 201 refers to the pair status 505 of the pair status/application status management table 202 with respect to all the pairs in the upper stage of the pair in which the fault has occurred. Then, the data management program 201 determines that a pair whose pair status 505 is in the "COPY" is present in the upper stage of the pair in which the fault has occurred, the data management program 201 determines whether the pair status 505 of all the pairs between the pair whose pair status 505 is in the "COPY" and the pair in which the fault has occurred is in the "PAIR".

Consequently, in the case where a pair whose pair status 505 is in the "COPY" is present in the upper stage of the pair in which the fault has occurred, and the pair status 505 of all the pairs between the pair whose pair status 505 is in the "COPY" and the pair in which the fault has occurred is in the "PAIR", the determination result in the step 1020 is "Yes". In this case, data is written in the pair in which the fault has occurred (or there is a possibility that data may be written therein), so there is a possibility that the consistency of the data may have been lost. Therefore, the process proceeds to the step 1004.

On the other hand, in the case where a pair whose pair status 505 is in the "COPY" is not present in the upper stage of the pair in which the fault has occurred, the determination result in the step 1020 is "No". Furthermore, even in the case where a pair whose pair status 505 is in the "COPY" is present in the upper stage of the pair in which the fault has occurred, and the pair status 505 of at least one pair between the pair whose pair status 505 is in the "COPY" and the pair in which the fault has occurred is not in the "PAIR", the determination result in the step 1020 is "No". In this case, there is no possibility that data is written in the pair in which the fault has occurred. Therefore, the data management program 201 determines that the consistency of the data is not lost (i.e., the data is not inconsistent) (1012) and completes the processing.

In the step 1002, the data management program 201 determines whether the pair in which the fault has occurred is synchronized with the application volume 605. Specifically, the data management program 201 determines whether the pair status 505 of all the pairs present between the PVOL of the pair in which the fault has occurred and the application volume 605 in a copy path including the PVOL is in the "PAIR".

In the case where the data management program 201 determines that the pair status 505 of all the pairs is not in the "PAIR" (i.e., at least one pair in the "SUSPEND" is present), the pair in which the fault has occurred is not synchronized with the application volume 605. In this case, the consistency of the data in the SVOL of the pair in which the fault has occurred is not lost by the fault. Therefore, the data management program 201 determines that the data is not inconsistent (1012) and completes the processing.

On the other hand, in the case where the data management program 201 determines that the pair status 505 of all the pairs is in the "PAIR", the pair in which the fault has occurred is synchronized with the application volume 605. In this case, the consistency of the data in the SVOL of the pair in which the fault has occurred may be lost by the fault.

Therefore, the data management program 201 determines whether the application has been staticized (1003). Specifically, the data management program 201 refers to the static flag 507 of the pair status/application status management table 202 with respect to the application volume 605 of the pair in which the fault has occurred.

In the case where the data management program 201 determines that the application has been staticized, the consistency of the data in the SVOL of the pair in which the fault has occurred is not lost by the fault. Therefore, the data management program 201 determines that the data is not inconsistent (1012) and completes the processing.

On the other hand, in the case where the data management program 201 determines that the application has not been staticized, there is a possibility that the consistency of the data in the SVOL of the pair in which the fault has occurred may have been lost by the fault. Since the data whose consistency is not ensured cannot be used, the data in the SVOL of the pair in which the fault has occurred is inconsistent (1004).

Therefore, the data management program 201 then determines whether the data in another logical volume is inconsistent by the fault. First, the SVOL of the pair in which the fault has occurred is assumed to be the logical volume 144 (search target volume) first targeted for a search (1005). Furthermore, the search target volume is registered in a target list (not shown). Herein, the target list is a list of the logical volume 144 in which data is inconsistent by a fault.

Next, among the pairs adjacent to the lower stage of the search target volume, a pair whose pair status is neither in the "PAIR" nor in the "COPY" is assumed to have been searched (1006).

Then, the data management program 201 determines whether an unsearched pair is present in the pairs adjacent to the lower stage of the search target volume (1007).

In the case where the data management program 201 determines that an unsearched pair is present in the pairs adjacent to the lower stage of the search target volume, the consistency of the data in the SVOL of the unsearched pair is lost. Therefore, the SVOL of the unsearched pair is set to be a new search target volume, and the SVOL is added to the target list (1008). Then, the unsearched pair is set to have been searched, and the process returns to the step 1006.

On the other hand, in the step 1007, in the case where an unsearched pair is not present in the pairs adjacent to the lower stage of the search target volume, the logical volume 144 in which data is inconsistent is not present any more in the lower stage of the search target volume.

Therefore, next, the data management program 201 determines whether the search target volume is an initial search target volume (see the step 1005) or an unsearched pair is present (1009).

In the case where the search target volume is not an initial search target volume, and an unsearched pair is present, an unsearched pair remains in the lower stage of the first search target volume. Therefore, the pair whose search target volume is an SVOL is set to have been searched. Then, the logical volume 144 adjacent to the upper stage of the search target volume (i.e., the PVOL of the pair whose search target volume is an SVOL) is set to be a new search target volume (1010), and the process returns to the step 1006.

On the other hand, in the step 1009, in the case where the search target volume is an initial search target volume (see the step 1005), or an unsearched pair is not present, the search for all the pairs in the lower stage of the initial search target volume has been completed.

Therefore, next, information on the logical volume 144 registered in the target list is output (1011), whereby the processing is completed. Specifically, information shown in FIG. 9 is output with respect to the logical volume 144 registered in the target list.

In the above processing shown in FIG. 10, a depth first search is used for the search (the steps 1005 to 1010) of the logical volume 144. However, even when another search method such as a breadth first search is used, this invention can be carried out.

Figure 11:
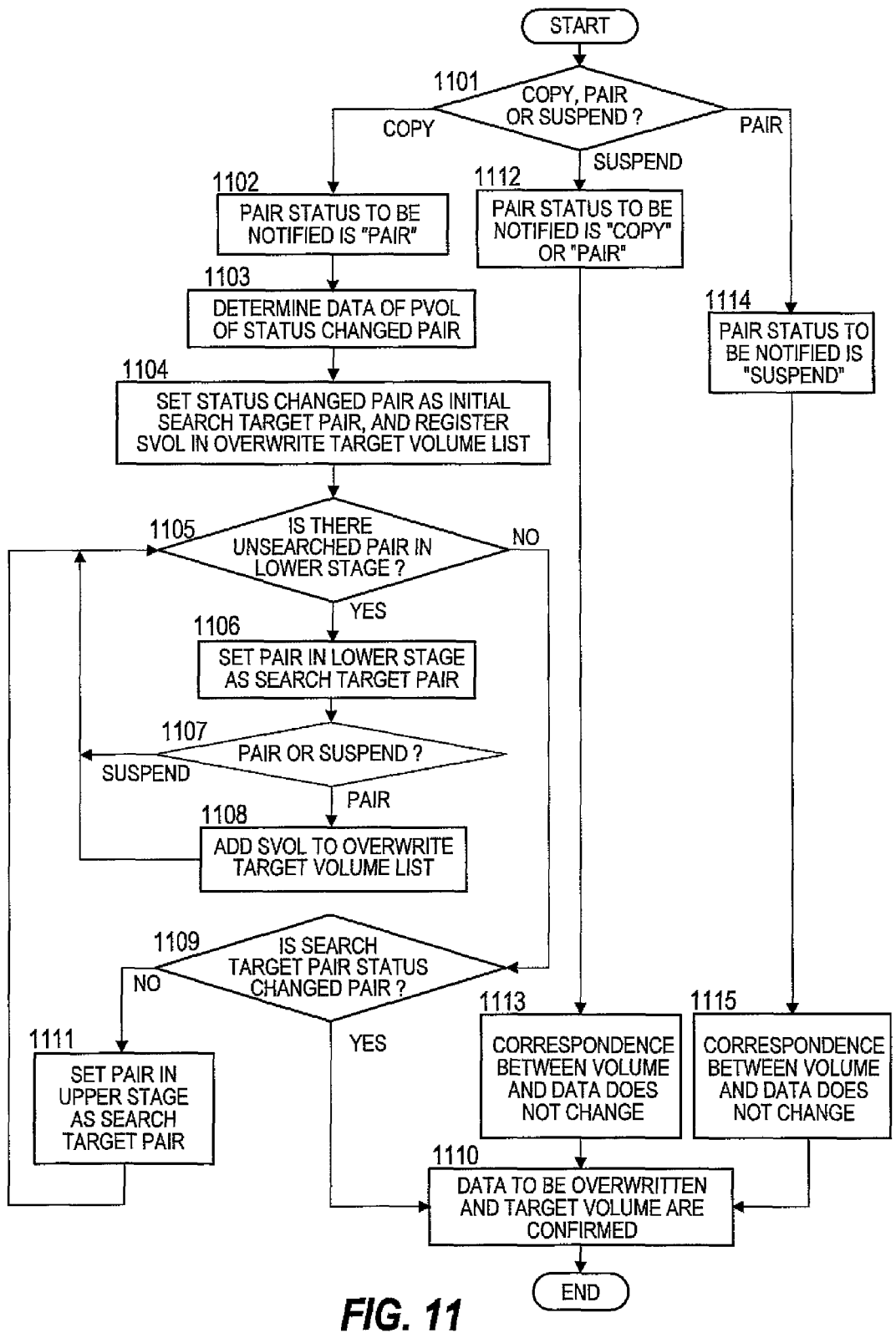
FIG. 11 is a flow chart of processing for determining data to be overwritten by a change when a pair status is changed by a pair operation in the embodiment of this invention.

FIG. 11 is a flow chart of processing for determining data to be overwritten by a change when a pair status is changed by a pair operation in the embodiment of this invention.

By performing the processing in FIG. 11, the correspondence relationship between the logical volume 144 and the data to be stored in the logical volume is determined.

The processing in FIG. 11 is performed by the data management program 201 in the step 810 in FIG. 8.

When the processing in FIG. 11 is started, the data management program 201 determines whether the pair status immediately before being changed is in the "COPY", "PAIR", or "SUSPEND" with respect to a pair whose pair status has been changed (1101).

In the case where the data management program 201 determines that the pair status immediately before being changed is in the "PAIR", the changed pair status is in the "SUSPEND". Thus, the change in the pair status into the "SUSPEND" is notified (1114). In this case, data is not overwritten in an SVOL of the pair. In other words, the data stored in the SVOL immediately before the pair status has been changed is the same as the data stored in the SVOL immediately after the pair status has been changed. Therefore, the correspondence relationship between the logical volume 144 and the data does not change (1115). Thus, it is confirmed that there is no data to be overwritten (1110), whereby the processing is completed.

On the other hand, in the step 1101, in the case where the data management program 201 determines that the pair status immediately before being changed is in the "SUSPEND", the changed pair status is in the "COPY" or "PAIR". Thus, the change in the pair status into the "COPY" or the "PAIR" is notified (1112).

If the data stored in the PVOL and SVOL of the pair immediately before the pair status has been changed are the same, data replication is not performed, and the "PAIR" status is obtained immediately. In this case, the data replication is not performed, so the correspondence relationship between the logical volume 144 and the data does not change (1113). In other words, the data stored in the SVOL immediately before the pair status has been changed is the same as the data stored in the SVOL immediately after the pair status has been changed. Thus, it is confirmed that there is no data to be overwritten (1110), whereby the processing is completed.

On the other hand, if the data stored in the PVOL and the SVOL of the pair are not the same, the "COPY" status is obtained, and data replication is performed. Thereafter, the "PAIR" status is obtained. In this case, although the data replication is performed, the data stored in the SVOL is not confirmed until the data replication is completed. Therefore, at a time when the "SUSPEND" status has been changed to the "COPY" status, it is confirmed that there is no data to be overwritten (1110), whereby the processing is completed.

On the other hand, in the step 1101, in the case where the data management program 201 determines that the pair status immediately before being changed is in the "COPY", the changed pair status is in the "PAIR". Thus, the change in the pair status into the "PAIR" is notified (1102). Then, the processing for determining data to be overwritten is started.

Initially, data stored in a pair whose pair status has been changed (hereinafter, referred to as a "status-changed pair") is determined (1103). Specifically, the data management program 201 refers to the data name 602, the application staticized time 603, the backup ID 604, and the like in the volume/data correspondence management table 203 with respect to the status-changed pair.

Then, the status-changed pair is assumed to be an initial search target pair (1104). Furthermore, the SVOL of the status-changed pair is registered in an overwrite target volume list (not shown). Herein, the overwrite target volume list is a list of the logical volume 144 in which data is overwritten by a change in pair status.

In other words, as a result of the change in pair status, it is determined that the correspondence relationship between the logical volume 144 and the data changes in the SVOL. Specifically, as a result that the data in the PVOL is overwritten onto the SVOL, the data stored in the SVOL becomes the same as the data stored in the PVOL.

Then, the data management program 201 determines whether an unsearched pair is present in the pairs adjacent to the lower stage of the search target pair (1105).

In the case where the data management program 201 determines that there is an unsearched pair, among the logical volumes 144 in which data is overwritten by the change in pair status, there may be those which are not registered in the overwrite target volume in the lower stage of the search target pair.

Therefore, next, the unsearched pair adjacent to the lower stage of the search target pair is set to be a new search target pair (1106).

Then, the data management program 201 determines whether the pair status of the newly set search target pair is in the "PAIR" or the "SUSPEND" (1107).

In the case where the data management program 201 determines that the pair status is in the "SUSPEND", data replication is not performed in the search target pair. Thus, data is not overwritten onto the SVOL of the search target pair. Furthermore, there is no logical volume 144 in which data is overwritten in the lower stage of the search target pair. Therefore, the search target pair is set to have been searched, and the process returns to the step 1105.

On the other hand, in the step 1107, in the case where the data management program 201 determines that the pair status is in the "PAIR", the data replication is performed in the search target pair. Thus, data is overwritten onto the SVOL of the search target pair. Therefore, the SVOL is added to the overwrite target volume list (1108).

In other words, as a result of the change in pair status, it is determined that the correspondence relationship between the logical volume 144 and the data changes in the SVOL. Specifically, as a result that the data in the PVOL is overwritten onto the SVOL, the data stored in the SVOL becomes the same as the data stored in the PVOL.

When the step 1108 is completed, the process returns to the step 1105.

On the other hand, in the step 1105, in the case where the data management program 201 determines that there is no unsearched pair, among the logical volumes 144 in which data is overwritten by the change in pair status, those which are present in the lower stage of the search target pair have been all registered in the overwrite target volume list.

Therefore, next, it is determined whether the search target pair is a status-changed pair (1109).

In the case where it is determined that the search target pair is not a status-changed pair, among the logical volumes 144 in which data is overwritten by the change in pair status, those which are not registered in the overwrite target volume list may be present in the lower stage of the status-changed pair. Therefore, the pair adjacent to the upper stage of the search target pair is set to be a new search target pair (1111), whereby the process returns to the step 1105.

On the other hand, in the case where it is determined that the search target pair is a status-changed pair, the logical volumes 144 in which data is overwritten by the change in pair status have been all registered in the overwrite target volume list. Therefore, the data to be overwritten and the logical volume 144 in which the data is stored are confirmed (1110), whereby the processing is completed.

Figure 12:
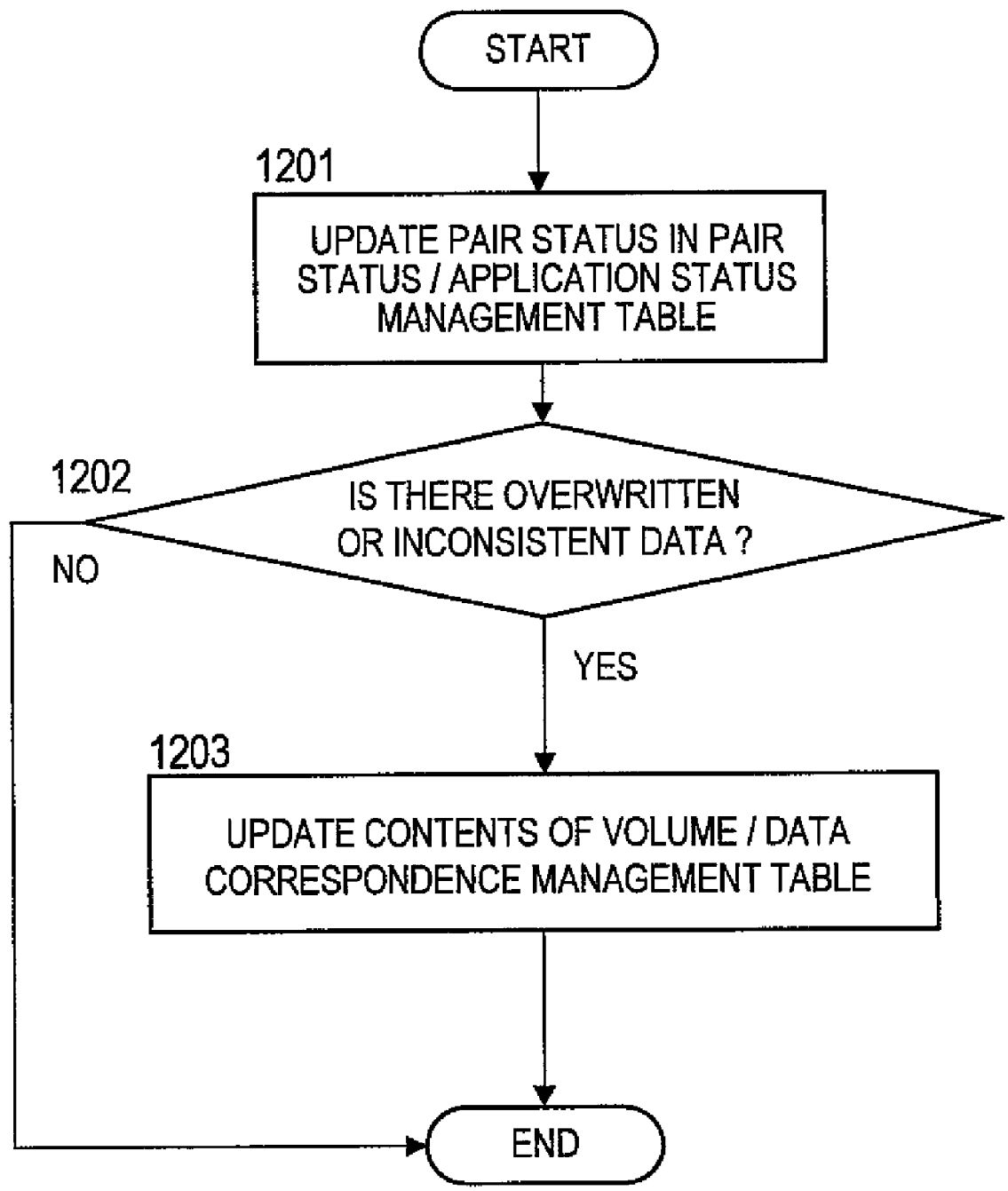
FIG. 12 is a flow chart of table update processing in the case where a pair status is changed in the embodiment of this invention.

FIG. 12 is a flow chart of table update processing in the case where a pair status is changed in the embodiment of this invention.

The table update processing in FIG. 12 is performed by the data management program 201 in the step 807 in FIG. 8.

When the table update processing is started, first, the pair status 505 of the pair status/application status management table 202 is updated with respect to a pair whose pair status has been changed (1201).

Next, it is determined whether there is data made to be inconsistent by a fault or data overwritten by a change in pair status (1202). Specifically, in the case where a fault occurs in a pair, it is determined whether there is data made to be inconsistent by the fault with reference to the result of the processing in FIG. 10. In the case where a pair operation is performed, it is determined whether there is data overwritten by the change of the pair status with reference to the result of the processing in FIG. 11.

In the case where it is determined that there is no data made to be inconsistent by the fault and no data overwritten by the change in the pair status in the step 1202, the processing is completed.

On the other hand, in the step 1202, in the case where it is determined that there is data made to be inconsistent by the fault or the data overwritten by the change in the pair status, the volume/data correspondence management table 203 is updated (1203). Specifically, the values of the data name 602, the application staticized time 603, the backup ID 604, and the application volume 605 of the logical volume 144 in which data has been overwritten are updated to the same values as those of the logical volume 144 of a replication source of data to be updated.

FIG. 13 is a flow chart of the processing performed by the data management program 201 when the pair status or the application status is changed in the computer system of the embodiment of this invention.

In the description of FIG. 13, the detailed description will be omitted with respect to the portions common to those of the processing (performed by the data management program 201 when a pair status is changed) in FIG. 8.

The change in an application status includes staticization of an application and cancel of staticization (i.e. destaticization) of an application. When an application is staticized, the application server 120 does not write data in the logical volume 144. On the other hand, when the staticization of an application is cancelled, the application server 120 can write data in the logical volume 144. When the application server 120 overwrites data in the logical volume 144, old data stored in the logical volume 144 is lost.

The processing in FIG. 13 is started when the user requests the management server 100 to monitor a pair status and an application status.

Upon receiving a request for monitoring a pair status and an application status from the user, the data management program 201 starts monitoring these statuses (1301). Then, the data management program 201 waits for a pair status change event or an application status change event (1302). More specifically, the data management program 201 waits for receiving a notification of a pair status change or an application status change from the pair management program 301 of the application server 140.

Upon receiving a pair status change event or an application status change event (1303), the data management program 201 then determines whether a pair status has been changed to the "ERROR" (1304).

In the case where it is determined that the pair status has been changed to the "ERROR" in the step 1304, a fault occurs in a pair whose pair status has been changed. Therefore, the data management program 201 then determines data made to be inconsistent by the fault occurring in the pair (1305). The procedure of the processing in the step 1305 is as described in FIG. 10.

Next, the data management program 201 outputs information regarding data (i.e., data made to be inconsistent by a fault) determined in the step 1305. The information output at this time is as described in FIG. 9.

Next, the data management program 201 updates the contents of the pair status/application status management table 202 and the volume/data correspondence management table 203 so that they are matched with the changed pair status (1307). The procedure of the update is as described in FIG. 12.

Next, the data management program 201 determines whether to complete the monitoring of a pair status and an application status (1308). More specifically, for example, the data management program 201 determines whether the user inputs an instruction of completing the monitoring of a pair status and an application status.

In the step 1308, in the case of determining not to complete the monitoring of a pair status and an application status, the data management program 201 returns to the step 1302 so as to continue the monitoring.

On the other hand, in the step 1308, in the case of determining to complete the monitoring of a pair status and an application status, the data management program 201 completes the monitoring of a pair status (1309).

On the other hand, in the step 1304, in the case of determining that the pair status has not been changed to the "ERROR", a pair operation has been performed in the pair or the application status has been changed. When the pair operation has been performed, the pair status has been changed. Consequently, the correspondence relationship between the logical volume 144 and the data may be changed. Furthermore, even when the application status has been changed, the correspondence relationship between the logical volume 144 and the data may be changed. Therefore, next, the data management program 201 determines the correspondence relationship between the logical volume 144 and the data (1310). The procedure of the processing in the step 1310 will be described later in detail (see FIG. 14). When the step 1310 is completed, the process proceeds to the step 1307.

As described above, according to the processing in FIG. 13, when a pair status or an application status is changed, the processing of determining data to be inconsistent or data to be overwritten is performed with the detection of the change as a trigger. Therefore, in the case where a fault occurs in a pair or a pair status or an application status is changed by another application or the like, as well as in the case where the user performs a pair operation using the pair management program 301 or the like or updates an application status, the processing in FIG. 13 is performed, and the data to be inconsistent or the data to be overwritten is determined.

Figure 14:
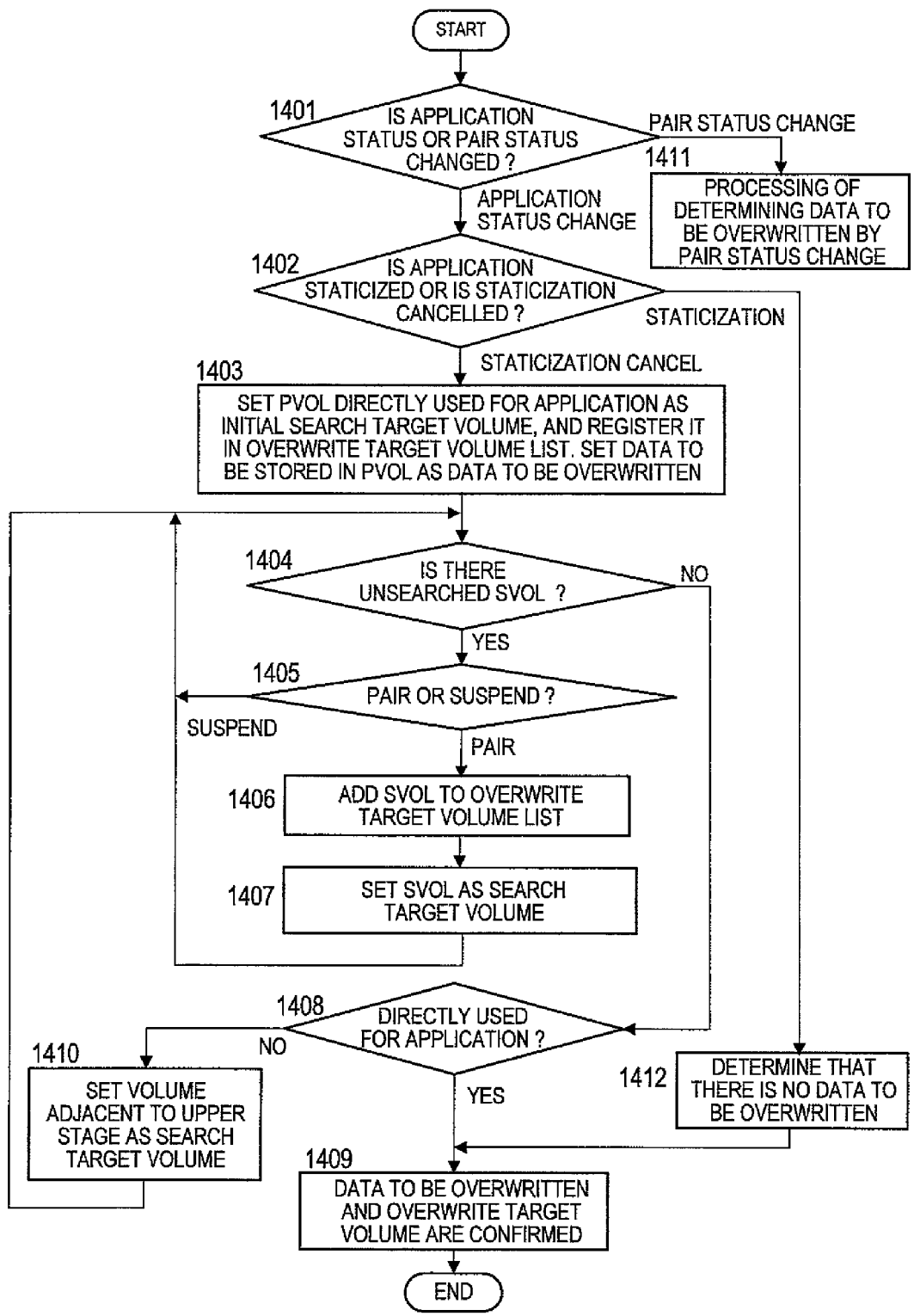
FIG. 14 is a flow chart of processing for determining data to be overwritten by a change when a pair status is changed by a pair operation or an application status is changed in the embodiment of this invention.

FIG. 14 is a flow chart of the processing for determining data to be overwritten by a change, when a pair status is changed by a pair operation or an application status is changed in the embodiment of this invention.

The processing in FIG. 14 is performed by the data management program 201 in the step 1310 in FIG. 13.

When the processing in FIG. 14 is started, the data management program 201 determines which of an application status and a pair status has been changed (1401).

In the case of determining that the pair status has been changed, the data management program 201 performs the processing of determining data to be overwritten by the change in the pair status (1411). This processing has been described in FIG. 11, so the description thereof will be omitted here.

On the other hand, in the case of determining that the application status has been changed, next, the data management program 201 then determines whether an application has been staticized or the application staticization has been cancelled (1402). In the case where the application staticization has been performed, data is not lost by overwrite (1412), so the process proceeds to a step 1409.

On the other hand, in the case where the application staticization has been cancelled, data may be lost by overwrite. Therefore, next, the logical volume 144 used directly for an application (i.e., the logical volume 144 directly accessed by the application server) is set to be the logical volume 144 to be first targeted for a search (search target volume) (1403). Furthermore, the search target volume is registered in the overwrite target volume list. The overwrite target volume list is the same as that described in FIG. 11. Furthermore, the data to be stored in the search target volume is assumed to be the data to be overwritten.

Furthermore, the data in the logical volume 144 in the lower stage of the search target volume may be lost by overwrite. More specifically, the data in the logical volume 144 connected by at least one pair whose pair status is in the "PAIR" in the lower stage of the search target volume is lost by overwrite. In order to determine the logical volume 144 in the lower stage in which data is overwritten, the logical volume 144 in the lower stage of the search target volume starts being searched for.

Next, it is determined whether there is an SVOL that forms a pair with the search target volume and has not been searched (1404).

In the case where there is an SVOL that forms a pair with the search target volume and has not been searched, the search for the logical volume 144 in the lower stage of the search target volume has not been completed. Therefore, next, it is determined whether the pair status of the pair formed by the search target volume and the unsearched SVOL is in the "PAIR" or "SUSPEND" (1405).

In the case where the pair status is in the "SUSPEND", data is not overwritten on the SVOL. Therefore, the SVOL is set to have been searched, and in order to check another SVOL, the process returns to the step 1404. At this time, data is not overwritten even on the logical volume 144 in the lower stage of the SVOL. Therefore, it is not necessary to conduct a search for the logical volume 144 in the lower stage of the SVOL.

On the other hand, in the case where the pair status is in the "PAIR" in the step 1405, data is overwritten on the SVOL. Therefore, the SVOL is added to an overwrite target volume list (1406).

Next, the search target volume is set to have been searched, and the SVOL is set as a new search target volume (1407); thereafter, the process returns to the step 1404.

On the other hand, in the step 1404, in the case where there is no SVOL that forms a pair with a search target volume and has not been searched, the search for the logical volume 144 in the lower stage of the search target volume has been completed. Therefore, next, it is determined whether the search target volume is the logical volume 144 to be directly used for an application (1408).

In the case where the search target volume is not the logical volume 144 to be directly used for an application, an unsearched logical volume 144 may remain. Therefore, in order to search for the unsearched logical volume 144, the search target volume is set to have been searched, and the logical volume 144 adjacent to the upper stage of the logical volume 144 is set as a new search target volume (1410); thereafter, the process returns to the step 1404.

On the other hand, in the case where the search target volume is the logical volume 144 to be used directly for an application, the search for the logical volume 144 has been completed. Therefore, data to be overwritten and an overwrite target volume are confirmed (1409), and the processing is completed.

Figure 15:
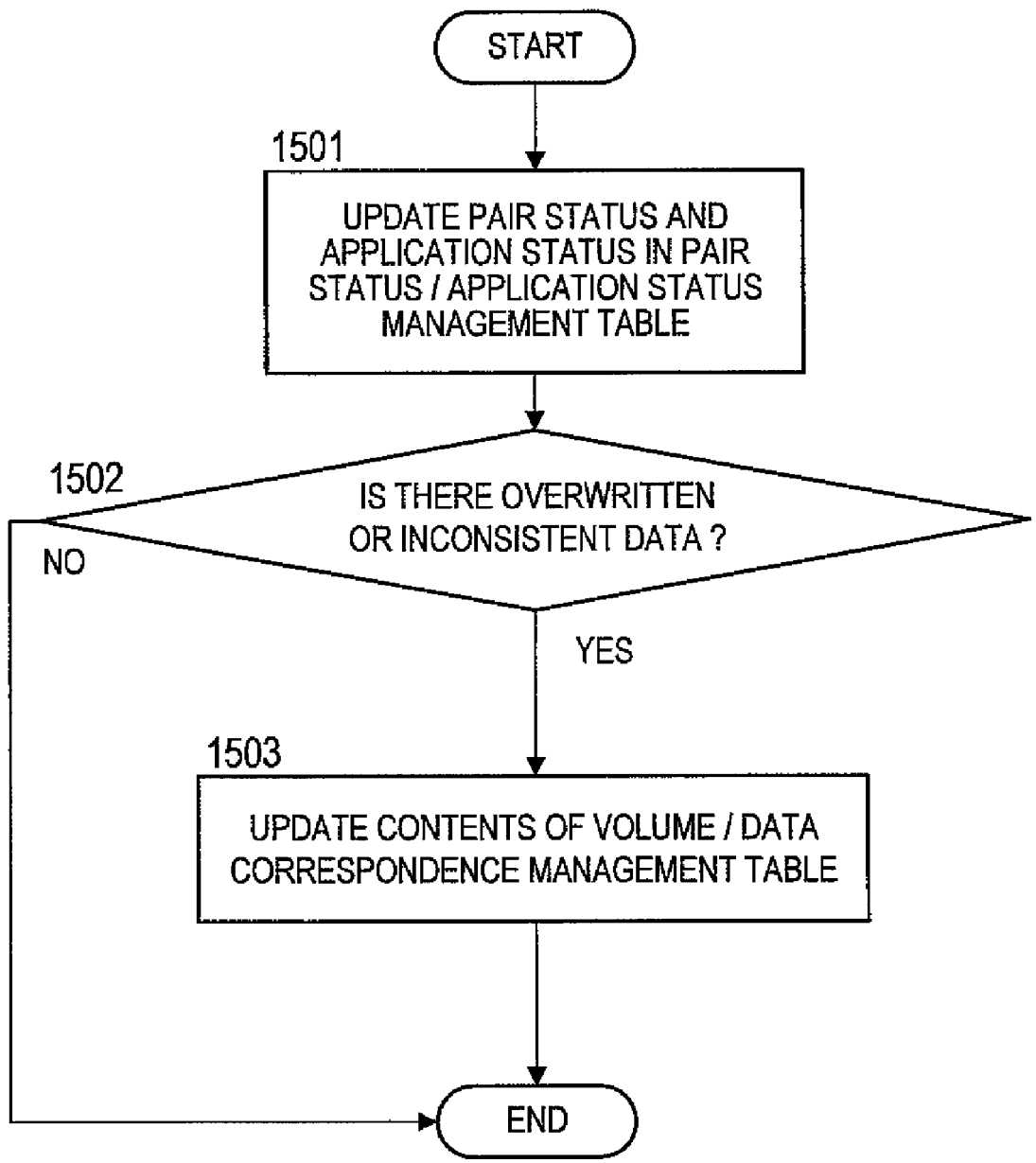
FIG. 15 is a flow chart of table update processing in the case where a pair status or an application status is changed in the embodiment of this invention.

FIG. 15 is a flow chart of table update processing in the case where a pair status or an application status is changed in the embodiment of this invention.

The table update processing in FIG. 15 is performed by the data management program 201 in the step 1307 in FIG. 13.

When the table update processing is started, first, the pair status/application status management table 202 is updated (1501). More specifically, in the case where a pair status is changed, the pair status 505 of the pair status/application status management table 202 is updated with respect to the pair whose pair status has been changed. In the case where an application status is changed, the application 506 of the pair status/application status management table 202 is updated with respect to the application whose application status has been changed.

Next, it is determined whether there is data made to be inconsistent by a fault or data overwritten by the change in the pair status or the change in the application status (1502). More specifically, in the case where a fault occurs in a pair, the result of the processing in FIG. 10 is referred to, whereby it is determined whether there is data made to be inconsistent by a fault. In the case where a pair operation is performed, the result of the processing in FIG. 11 is referred to, whereby it is determined whether there is overwritten data. In the case where an application status is changed, the result of the processing in FIG. 14 is referred to, whereby it is determined whether there is overwritten data.

In the step 1502, in the case where it is determined that there is neither inconsistent data nor overwritten data, the processing is completed.

On the other hand, in the step 1502, in the case where there is inconsistent data or overwritten data, the volume/data correspondence management table 203 is updated (1503). More specifically, the values of the data name 602, the application staticized time 603, the backup ID 604, and the application volume 605 of the logical volume 144 in which data has been overwritten are updated to the same values as those of the logical volume 144 of a replication source of data to be overwritten.

Figure 16:
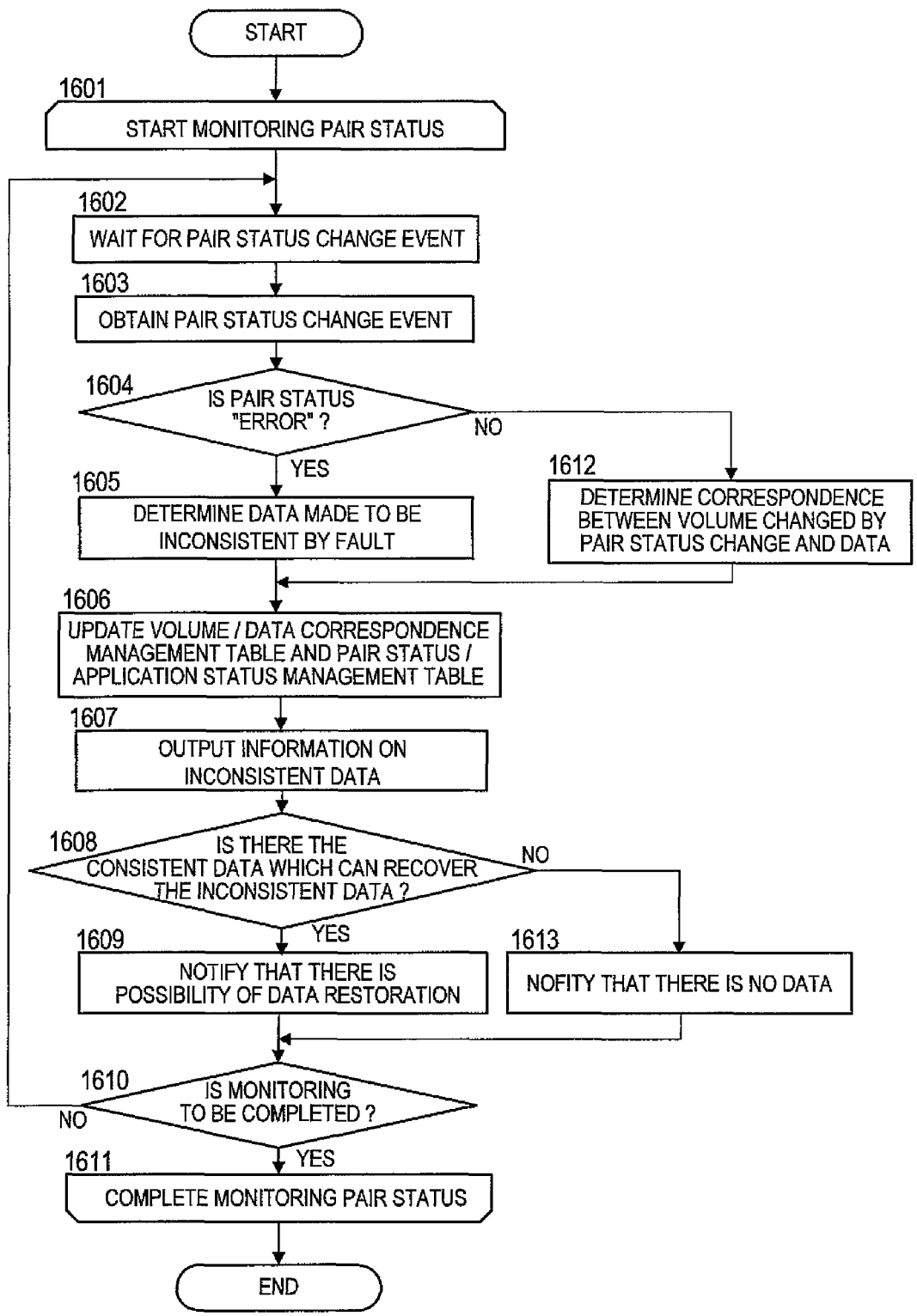
FIG. 16 is a flow chart of processing of outputting information for supporting restoration of inconsistent data in the embodiment of this invention.

FIG. 16 is a flow chart of the processing of outputting information for supporting restoration of inconsistent data in the embodiment of this invention.

The processing in FIG. 16 is performed by the data management program 201.

In the processing in FIG. 16, the detailed description of the parts common to those in FIG. 8 will be omitted.

In FIG. 16, steps 1601 to 1605 are respectively the same as the steps 801 to 805 in FIG. 8. Furthermore, steps 1606, 1607, and 1612 are respectively the same as the steps 807, 806, and 810.

As the precondition for performing the processing in FIG. 16, it is necessary that the contents of the pair status/application status management table 202 and the volume/data correspondence management table 203 be the latest.

The processing in FIG. 16 is started when a user requests the management server 100 to monitor a pair status.

Upon receiving a request for monitoring of a pair status from the user, the data management program 201 starts monitoring a pair status (1601). Then, the data management program 201 waits for a pair status change event (1602).

Upon obtaining the pair status change event (i.e., receiving a notification of a pair status change) (1603), the data management program 201 determines whether the changed pair status is in the "ERROR" (1604).

In the step 1604, in the case where it is determined that the changed pair status is in the "ERROR", a fault occurs in a pair whose pair status has been changed. Therefore, next, the data management program 201 determines data made to be inconsistent by the fault occurring in the pair (1605). The procedure of the processing in the step 1605 is as shown in FIG. 10.

On the other hand, in the step 1604, in the case where it is determined that the changed pair status is not in the "ERROR", a pair operation is performed in the pair. Therefore, the data management program 201 determines the correspondence relationship between the logical volume 144 changed by the pair operation and data (1612). The procedure of the processing in the step 1612 is as shown in FIG. 11.

After performing the step 1605 or 1612, the data management program 201 updates the contents of the pair status/application status management table 202 and the volume/data correspondence management table 203 so that they are matched with the changed pair status (1606). The procedure of the update is as shown in FIG. 12.

Next, the data management program 201 outputs information on the data (i.e., data made to be inconsistent by a fault) determined in the step 1605 (1607). The information output at this time is as shown in FIG. 9.

Next, the data management program 201 determines whether the logical volume 144 in which consistent data, which can recover the data made to be inconsistent by the fault occurring in the pair, is stored is present in a copy path (1608).

More specifically, the data management program 201 refers to the information output in the step 1607 (FIG. 9) and the volume/data correspondence management table 203 (FIG. 6). Then, the data management program 201 determines whether there is the volume 601 in which the value of the data name 602 is the same as the content 902 of the data name 903, and in which the value of the application staticized time 603 is the same as the content 902 of the application staticized time 904. In the case where there is the volume 601 in which they are the same, the consistent data, which can recover the data made to be inconsistent by the fault occurring in the pair, is stored in the logical volume 144 corresponding to the volume 601.

In the step 1608, in the case where the data management program 201 determines that the logical volume 144 in which the consistent data, which can recover the data made to be inconsistent by the fault occurring in the pair, is stored is present in a copy path, the data management program 201 notifies the management server 100 that the inconsistent data can be restored by using the data in the logical volume 144 (1609). At this time, in the input/output unit 101 of the management server 100, the logical volume 144 in which the inconsistent data is stored, and the logical volume 144 in which the consistent data, which can recover the inconsistent data, is stored may be shown (see FIG. 17).

The user can restore the inconsistent data based on the information (including the information shown in FIG. 17) notified in the step 1609.

On the other hand, in the step 1608, in the case where the data management program 201 determines that the logical volume 144 in which the consistent data which can recover the data made to be inconsistent by the fault occurring in the pair is stored is not present in the copy path, the data management program 201 notifies the management server 100 that the consistent data which can recover the inconsistent data is not present (1613).

After performing the step 1609 or 1613, the data management program 201 determines whether to complete the monitoring of a pair status (1610).

In the step 1610, in the case where the data management program 201 determines not to complete the monitoring of a pair status, the data management program 201 returns to the step 1602 so as to continue monitoring a pair status.

On the other hand, in the step 1610, in the case of determining to complete the monitoring of the pair status, the data management program 201 completes the monitoring of a pair status (1611), whereby the processing in FIG. 16 is completed.

Figure 17:
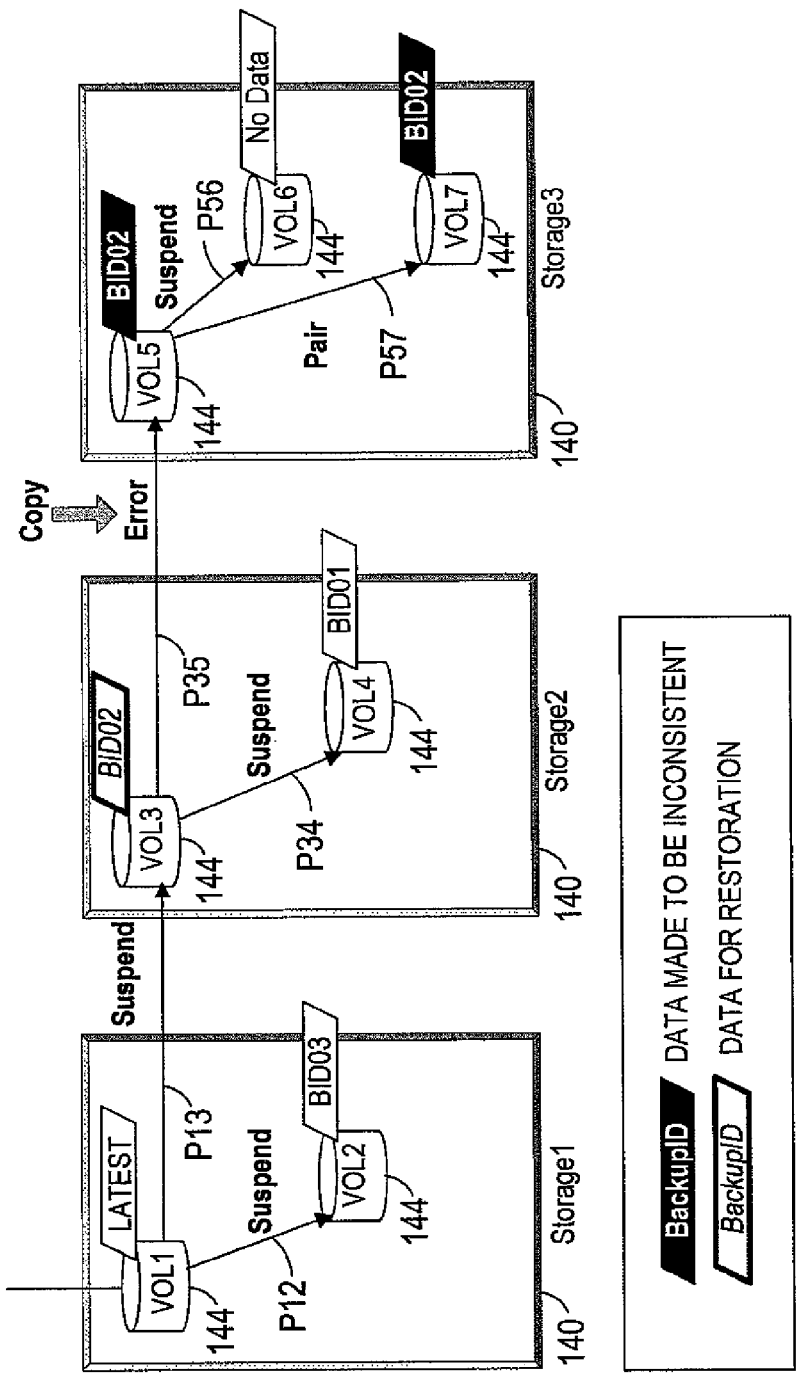
FIG. 17 is a diagram illustrating a screen display outputting information for supporting the restoration of the inconsistent data in the embodiment of this invention.

FIG. 17 is a diagram illustrating a screen display outputting information for supporting the restoration of the inconsistent data in the embodiment of this invention.

FIG. 17 shows an example of a screen display output in the step 1609 in FIG. 16.

The screen display is, for example, output from a screen display (not shown) of the input/output unit 101 of the management server 100.

In FIG. 17, a storage 1, a storage 2, and a storage 3 correspond to the storage system 140.

The VOL1 and the VOL2 correspond to the logical volumes 144 stored in the storage 1.

The VOL3 and the VOL4 correspond to the logical volumes 144 stored in the storage 2.

The VOL5, the VOL6, and the VOL7 correspond to the logical volumes 144 stored in the storage 3.

The VOL1 to VOL7 form one copy path.

The VOL1 and the VOL 2 form a pair P12. In the pair P12, the VOL1 is a PVOL, the VOL2 is an SVOL, and the pair status is in the "SUSPEND".

The VOL1 and the VOL3 form a pair P13. In the pair P13, the VOL1 is a PVOL, the VOL3 is an SVOL, and the pair status is in the "SUSPEND".

The VOL3 and the VOL4 form a pair P34. In the pair P34, the VOL3 is a PVOL, the VOL4 is an SVOL, and the pair status is in the "SUSPEND".

The VOL3 and the VOL5 form a pair P35. In the pair P35, the VOL3 is a PVOL, the VOL5 is an SVOL, and the pair status is in the "COPY".

The VOL5 and the VOL6 form a pair P56. In the pair P56, the VOL5 is a PVOL, the VOL6 is an SVOL, and the pair status is in the "SUSPEND".

The VOL5 and the VOL7 form a pair P57. In the pair P57, the VOL5 is a PVOL, the VOL7 is an SVOL, and the pair status is in the "PAIR".

The origin of an arrow displaying each pair is on the PVOL side, and the tip end thereof is on the SVOL side.

In FIG. 17, the pairs P13 and P35 are those which are formed by the remote copy, and the pairs P12, P34, P56, and P57 are those which are formed by the local copy.

In FIG. 17, first, the pair status of the pair P35 is in the "COPY".

At this time, in the VOL1, data in which the backup ID 604 is in the "LATEST" is stored.

In the VOL2, data in which the backup ID 604 is in the "BID03" is stored.

In the VOL3, data in which the backup ID 604 is in the "BID02" is stored.

Since the pair status of the pair P35 is in the "COPY", data replication is being performed in the pair P35. In other words, in the VOL5, a part of data (i.e., "BID02") of the VOL3 is replicated.

Since the pair status of the pair P57 is in the "PAIR", the data in the VOL5 is reflected on the VOL7. In other words, a part of the data (i.e., "BID02") of the VOL3 is replicated even in the VOL7.

In the VOL4, data in which the backup ID 604 is in the "BID01" is stored.

In the VOL6, data is not stored ("NO_Data").

FIG. 17 shows an example of a screen display when a fault is occurring in the pair P35. When a fault occurs in the pair P35, the data replication from the VOL3 to the VOL5 is interrupted, with the result that the consistency of the data "BID02" of the VOL5 is lost. Furthermore, since the pair status of the pair P57 is in the "PAIR", data whose consistency is lost is also replicated from the VOL5 to the VOL7. Consequently, the data "BID02" is lost from the VOL5 and the VOL7 (In other words, the data "BID02" is inconsistent).

On the other hand, the data "BID02" stored in the VOL3 is not influenced by the fault of the pair P35. Therefore, the data "BID02" of the VOL3 is also present even after the fault has occurred in the pair P35.

In the example shown in FIG. 17, data made to be inconsistent by a pair fault (i.e., data "BID02" of the VOL5 and the VOL7) is displayed in reverse video (outline). Furthermore, in the case where the consistent data, which can recover the inconsistent data, is present in the copy path, that data (i.e., data "BID02" of the VOL3) is displayed in italicized letters.

The user is capable of knowing that the data in the VOL5 and the VOL7 have been made to be inconsistent by the fault of the pair P35, with reference to the display in FIG. 17. Furthermore, the user is capable of knowing that the consistent data, which can recover the inconsistent data in the VOL5 and the VOL7, is stored in the VOL3. Therefore, the user can perform the processing of restoring the inconsistent data. For example, by performing the "RESYNC" in the pair P35 after the fault of the pair P35 has been restored, the data "BID02" is replicated from the VOL3 to the VOL5 and the VOL7. Consequently, the inconsistent data is restored.

Next, the processing of restoring inconsistent data in the case where data is made to be inconsistent by a pair fault in this embodiment will be described.

Even in the case where data is made to be inconsistent by a pair fault, the inconsistent data may be restored by performing the pair operation "RESYNC" in the pair in which the fault has occurred. For example, in FIG. 17, when the "RESYNC" is performed in the pair P35, the data in the VOL5 and VOL7 are restored. Whether the pair operation "RESYNC" can be performed in the pair in which the fault has occurred is determined by the degree of the occurring fault.

As the precondition for the following processing, the event of a fault must be provided with a fault detail code. The fault detail code refers to attribute information representing the degree of a fault.

Figure 18:
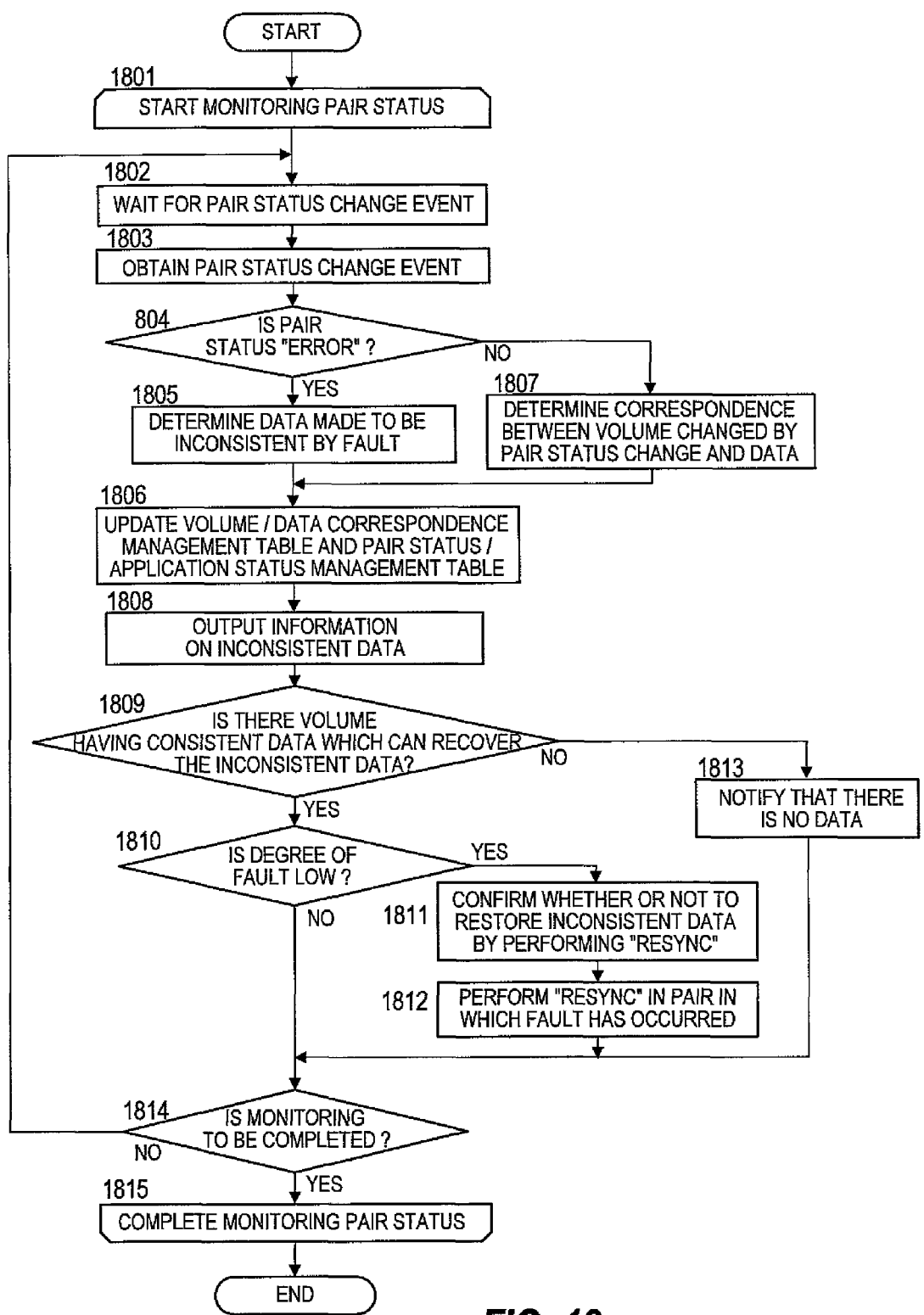
FIG. 18 is a flow chart of the processing of restoring data made to be inconsistent by a fault in the embodiment of this invention.

FIG. 18 is a flow chart of the processing of restoring data made to be inconsistent by a fault in the embodiment of this invention.

The processing in FIG. 18 is performed by the data management program 201.

In FIG. 18, steps 1801 to 1806 are respectively the same as the steps 1601 to 1606 in FIG. 8. Furthermore, steps 1807, 1808, 1814, and 1815 are respectively the same as the steps 1612, 1607, 1610, and 1611. Therefore, the description of those steps will be omitted.

In FIG. 18, when a pair fault occurs (1804), data made to be inconsistent by the fault is determined (1805), and each table is updated (1806), information on the data made to be inconsistent by the fault is output (1808). In the following description, the output may be to display a display screen (not shown) of the input/output unit 101 of the management server 100, to transmit the information to a predetermined address, to write the information in a file (not shown) of a management log, or the like.

Next, the inconsistent data is compared with the data stored in the logical volume in the upper stage of the pair in which the fault has occurred, whereby it is determined whether there is the logical volume 144 in which the consistent data which can recover the inconsistent data is stored (1809).

In the case where there is the logical volume 144 in which the consistent data which can recover the inconsistent data is stored, and the pair statuses of all the pairs in the copy path between the logical volume 144 and the pair in which the fault has occurred are in the "PAIR", "Yes" is determined in the step 1809. On the other hand, in the case where there is no logical volume 144 in which the consistent data which can recover the inconsistent data is stored, or in the case where there is a pair in a status other than the "PAIR" in the copy path between the logical volume 144 and the pair in which the fault has occurred, "No" is determined in the step 1809.

Whether there is the logical volume 144 in which the consistent data which can recover the inconsistent data is stored is determined with reference to, for example, the backup ID604 of the volume/data correspondence management table 203.

In the case where "No" is determined in the step 1809, the consistent data which can recover the inconsistent data is not present on the storage system 140, or the inconsistent data cannot be restored by performing the "RESYNC" in the pair in which the fault has occurred. Therefore, the data management program 201 outputs the fact that the pair operation is not performed (1813), and proceeds to a step 1814. In the step 1813, the data management program 201 may output the fact that the consistent data which can recover the inconsistent data is not present on the storage system 140, or the inconsistent data cannot be restored by performing the "RESYNC" in the pair in which the fault has occurred.

On the other hand, in the case where "Yes" is determined in the step 1809, next, it is determined whether the degree of the fault is low, i.e., whether a pair operation "RESYNC" can be performed in the pair in which the fault has occurred (1810). This determination is performed with reference to the fault detail code provided to the event of the fault and a fault detail code table 204. The fault detail code table 204 will be described in detail later (see FIG. 19).

In the step 1810, in the case where it is determined that the degree of the fault is high (i.e., the pair operation "RESYNC" cannot be performed in the pair in which the fault has occurred), the process proceeds to a step 1814.

On the other hand, in the step 1810, it is determined that the degree of the fault is low (i.e., the pair operation "RESYNC" can be performed in the pair in which the fault has occurred), next, the data management program 201 output a display for confirming whether to permit the restoration of the inconsistent data by performing the pair operation "RESYNC" in the pair in which the fault has occurred, and waits for a response from the user (1811).

In the step 1811, in the case where there is a response that the pair operation "RESYNC" is not permitted to be performed, or in the case where a pair status change event is received while the data management program 201 waits for a response from the user, the process returns to the step 1803.

On the other hand, in the step 1811, in the case where there is a response that the pair operation "RESYNC" is permitted to be performed, the pair operation "RESYNC" is performed in the pair in which the fault has occurred (1812).

Next, it is determined whether to complete the monitoring of a pair status (1814). In the case where it is determined that the monitoring of a pair status is not completed, the process returns to the step 1802. In the case where it is determined that the monitoring of a pair status is completed, the monitoring of a pair status is completed (1815), and the processing in FIG. 18 is completed.

FIG. 19 is a diagram illustrating the fault detail code table 204 of the embodiment of this invention.

The fault detail code table 204 is stored in the disk device 102 of the management server 100, and is referred to by the data management program 201 (more specifically, the processing shown in FIG. 18). The fault detail code table 204 associates the fault detail code with the information showing whether the pair operation "RESYNC" can be performed in the pair in which the fault has occurred.

The fault detail code table 204 is composed of a fault detail code number (#) 1901, a fault detail code 1902, and a RESYNC acceptance/rejection 1903.

The fault detail code number 1901 is a serial number provided to the fault detail code.

The fault detail code 1902 is a code representing the degree of a fault. A fault event is provided with any of the fault detail code 1902.

The RESYNC acceptance/rejection 1903 represents whether the pair operation "RESYNC" can be performed with respect to each fault detail code 1902.

In the example shown in FIG. 19, the RESYNC acceptance/rejection 1903 of the fault detail code 1902 "x001" and "xca0" is "rejection". This shows that the fault corresponding to "x001" and "xca0" is serious, and the pair operation "RESYNC" cannot be performed with respect to the pair in which these faults have occurred.

For example, in the case where a fault detail code provided to an event of a fault is "x001", in the step 1810 in FIG. 18, the fault detail code table 204 is referred to. Then, since the RESYNC acceptance/rejection 1903 corresponding to the fault detail code 1902 "x001" is "rejection", it is determined that the fault is serious, and the pair operation "RESYNC" cannot be performed.

On the other hand, the RESYNC acceptance/rejection 1903 of the fault detail code 1902 "x002" and "xc99" are both "acceptance". This shows that the fault corresponding to "x002" and "xc99" is not serious, and the pair operation "RESYNC" can be performed with respect to the pair in which these faults have occurred.

For example, in the case where the fault detail code provided to the event of the fault is "x002", in the step 1810 in FIG. 18, the fault detail code table 204 is referred to. Then, since the RESYNC acceptance/rejection 1903 corresponding to the fault detail code 1902 "x002" is "acceptance", it is determined that the fault is not serious, and the pair operation "RESYNC" can be performed.

According to this embodiment as described above, when a pair status or an application status is changed, the processing for determining data to be inconsistent or overwritten is performed with the detection of the change as a trigger. Therefore, when a pair status or an application status is changed by another application program or the like, as well as when a user performs a pair operation or changes an application status, data to be overwritten on a logical volume by the change is determined.

Consequently, the contents of a latest pair status and application status, and a logical volume (i.e., correspondence between the logical volume and the data) can be grasped at all times.

Furthermore, when a fault occurs in a pair, the abovementioned latest pair status and the like are referred to, whereby data made to be inconsistent by the occurring fault can be accurately determined.

Furthermore, in the case where data is made to be inconsistent by the fault of the pair, it is determined whether there is the consistent data which can recover the inconsistent data in any of the logical volumes. In the case where there is the consistent data which can recover the inconsistent data, the location of the consistent data which can recover the inconsistent data is displayed. The user can perform the processing of restoring the inconsistent data by referring to the display.

Furthermore, it is determined whether the inconsistent data can be restored by performing the pair operation "RESYNC" in the pair in which the fault has occurred. In the case where the data can be restored, the user is inquired about whether the "RESYNC" is performed. In the case where the user permits the "RESYNC" to be performed, the "RESYNC" is performed, whereby the inconsistent data is restored.

Thus, this embodiment supports the restoration of data made to be inconsistent by the fault occurring in the pair.

What is claimed is:

1. A data storing system comprising:
   a first storage system providing a first logical volume;
   a second storage system providing a second logical volume;
   a third storage system providing a third logical volume;
   a management computer coupled to the first storage system, the second storage system, and the third storage system,
   wherein the first logical volume and the second logical volume forms a first replication pair which indicates the first logical volume is a replication source and the second logical volume is a replication destination, and the second logical volume and the third logical volume forms a second copy pair which indicates the second logical volume is the replication source and the third logical volume is the replication destination,
   wherein the first replication pair and the second replication pair each have a pair status selected from:
   a first pair status in which update data stored in a volume of the replication source are stored in a volume of the replication destination;
   a second pair status in which storing the update data, which is stored in the volume of the replication source, to the volume of the replication destination, is suspended; and
   an intermediate pair status, which is an intermediate status from the second pair status to the first pair status, and in which the suspended update data are copied from the volume of the replication source to the volume of the replication destination, and
   wherein, in case of the pair status of the first replication pair is the intermediate pair status and the pair status of the second replication pair is the first pair status, the management computer displays that data stored in the third logical volume is inconsistent due to the pair status of the first replication pair being the intermediate pair status and the pair status of the second replication pair being the first pair status.

2. A data storing system according to claim 1,
   wherein, in case of the pair status of the first replication pair and the pair status of the second replication pair status are the first pair status, the management computer displays that data stored in the third logical volume is consistent.

3. A data storing system according to claim 2,
   wherein the management computer monitors the status of the first replication pair and the status of the second replication pair.

4. A non-transitory computer-readable media embodying program code for a management computer coupled to a first storage system providing a first logical volume, a second storage system providing a second logical volume, and a third storage system providing a third logical volume, the program code comprising:
   a first pair management code causing the management computer to manage the first logical volume and the second logical volume being a first replication pair which indicates the first logical volume is a replication source and the second logical volume is a replication destination, and to manage the second logical volume and the third logical volume being a second copy pair which indicates the second logical volume is the replication source and the third logical volume is the replication destination;
   a second pair management code causing the management computer to manage a pair status of the first replication pair and a pair status of the second replication pair; and
   a third pair management code causing the management computer to display that data stored in the third logical volume is inconsistent due to the pair status of the first replication pair being an intermediate pair status and the pair status of the second replication pair being a first pair status, in case of the pair status of the first replication pair is the intermediate pair status and the pair status of the second replication pair is the first pair status,
   wherein the first pair status in which update data stored in a volume of the replication source are stored in a volume of the replication destination,
   wherein a second pair status in which storing the update data, which is stored in the volume of the replication source, to the volume of the replication destination, is suspended, and
   wherein the intermediate pair status, which is an intermediate status from the second pair status to the first pair status, and in which the suspended update data are copied from the volume of the replication source to the volume of the replication destination.

5. A non-transitory computer-readable media according to claim 4, the program code comprising:
   an inconsistency management code causing the management computer to display that data stored in the third logical volume is consistent, in case of the pair status of the first replication pair and the pair status of the second replication pair status are the first pair status.

6. A non-transitory computer-readable media according to claim 5, comprising:
   a monitoring code causing the management computer to monitor the status: of the first replication pair and the status of the second replication pair.

* * * * *